(12) United States Patent
Kurotobi et al.

(10) Patent No.: US 10,733,889 B2
(45) Date of Patent: Aug. 4, 2020

(54) METHOD AND DEVICE FOR PARKING ASSISTANCE

(71) Applicant: Nissan Motor Co., Ltd., Yokohama-shi, Kanagawa (JP)

(72) Inventors: Tomoko Kurotobi, Kanagawa (JP); Naoki Kojo, Kanagawa (JP); Masahiro Miura, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/096,445

(22) PCT Filed: Apr. 28, 2016

(86) PCT No.: PCT/JP2016/063331
§ 371 (c)(1),
(2) Date: Oct. 25, 2018

(87) PCT Pub. No.: WO2017/187592
PCT Pub. Date: Nov. 2, 2017

(65) Prior Publication Data
US 2019/0130747 A1    May 2, 2019

(51) Int. Cl.
*G08G 1/14* (2006.01)
*B60W 30/06* (2006.01)
(Continued)

(52) U.S. Cl.
CPC .............. *G08G 1/141* (2013.01); *B60R 21/00* (2013.01); *B60W 30/06* (2013.01); *B60W 40/04* (2013.01);
(Continued)

(58) Field of Classification Search
CPC .... G08G 1/141; G08G 1/143; B62D 15/0285; G06K 9/00; B60R 21/00; B60W 10/20;
(Continued)

(56) References Cited

U.S. PATENT DOCUMENTS

2011/0022269 A1* 1/2011 Nakazono ................ G08G 1/14
701/41
2014/0365108 A1* 12/2014 You .................... B62D 15/0285
701/408
(Continued)

FOREIGN PATENT DOCUMENTS

EP    2982561 A2    2/2016
EP    3392093 A1    10/2018
(Continued)

*Primary Examiner* — Nga X Nguyen
(74) *Attorney, Agent, or Firm* — Young Basile Hanlon & MacFarlane, P.C.

(57) ABSTRACT

A parking assist method includes acquiring recognition information on parked vehicles existing in a parking lot; extracting two or more vehicles parked side by side from the recognition information and grouping the two or more vehicles into a set of vehicles; and when a space into which parking is possible exists between the parked vehicles included in the grouped set of vehicles, estimating the space as an available parking space. The disclosure further includes setting a pathway direction reference line extending along a pathway of the parking lot; calculating reference distances between the pathway direction reference line and the parked vehicles included in the above recognition information; and extracting the two or more vehicles from the above recognition information and grouping the two or more vehicles into the set of vehicles on the basis of the calculated reference distances.

7 Claims, 22 Drawing Sheets

(51) Int. Cl.
*B60W 40/04* (2006.01)
*G01S 13/00* (2006.01)
*G01S 13/931* (2020.01)
*B60R 21/00* (2006.01)
*B62D 15/02* (2006.01)
*G06K 9/00* (2006.01)
*B60W 50/00* (2006.01)
*B60W 10/04* (2006.01)
*B60W 10/20* (2006.01)

(52) U.S. Cl.
CPC ......... *B60W 50/00* (2013.01); *B62D 15/0285* (2013.01); *G01S 13/00* (2013.01); *G01S 13/931* (2013.01); *G06K 9/00812* (2013.01); *G08G 1/143* (2013.01); *B60W 10/04* (2013.01); *B60W 10/20* (2013.01); *B60W 2400/00* (2013.01); *B60W 2710/20* (2013.01); *B60W 2720/106* (2013.01); *G01S 2013/9314* (2013.01); *G01S 2013/9323* (2020.01); *G01S 2013/93271* (2020.01); *G01S 2013/93274* (2020.01)

(58) Field of Classification Search
CPC ......... B60W 2400/00; B60W 2710/20; B60W 2720/106; B60W 10/04; B60W 30/06; B60W 40/04; B60W 50/00; G01S 2013/9385; G01S 2013/9375; G01S 2013/9367; G01S 2013/9314; G01S 13/931; G01S 13/00

See application file for complete search history.

(56) References Cited

U.S. PATENT DOCUMENTS

| | | | |
|---|---|---|---|
| 2017/0186317 A1* | 6/2017 | Franklin | G08G 1/149 |
| 2017/0259850 A1 | 9/2017 | Yamashita et al. | |
| 2018/0037262 A1* | 2/2018 | Imai | B60W 30/06 |
| 2018/0328750 A1* | 11/2018 | Yun | G01C 21/3415 |
| 2018/0370566 A1* | 12/2018 | Kojo | G08G 1/168 |

FOREIGN PATENT DOCUMENTS

| | | | |
|---|---|---|---|
| EP | 3392109 A1 | 10/2018 | |
| JP | 2007315956 A | 12/2007 | |
| JP | 2009234294 A | 10/2009 | |
| JP | 2010012908 A | 1/2010 | |
| JP | 2013116698 A | 6/2013 | |
| KR | 20060017037 A | 2/2006 | |
| KR | 20060017038 A | 2/2006 | |
| WO | 2016039427 A1 | 3/2016 | |
| WO | 2017179206 A1 | 10/2017 | |

* cited by examiner

METHOD AND DEVICE FOR PARKING ASSISTANCE

TECHNICAL FIELD

The present invention relates to a parking assist method and a parking assist device.

BACKGROUND

A parking lot guidance method is known which include performing a white line recognition process on the image data, obtained by an onboard camera imaging a parking area, and recognizing a parking frame on the basis of the recognition result (see JP2007-315956A, for example).

In the parking lot guidance method as described in JP2007-315956A, when a white line representing a parking frame cannot be recognized for some reasons, such as that no white line exists or the white line is unclear, the parking frame cannot be recognized and an available parking space cannot be estimated.

SUMMARY

A problem to be solved by the present invention is to provide a parking assist method and a parking assist device with which an available parking space can be estimated regardless of whether or not a white line representing a parking frame can be recognized.

The present invention solves the above problem through extracting two or more vehicles parked side by side from recognition information on parked vehicles existing in a parking lot, grouping the two or more vehicles into a set of vehicles, and estimating an available parking space between the parked vehicles included in the set of vehicles.

According to the present invention, an effect can be obtained that an available parking space can be estimated by using the grouping result of the recognized set of vehicles regardless of whether or not a white line representing a parking frame can be recognized.

DETAILED DESCRIPTION

Figure 1:
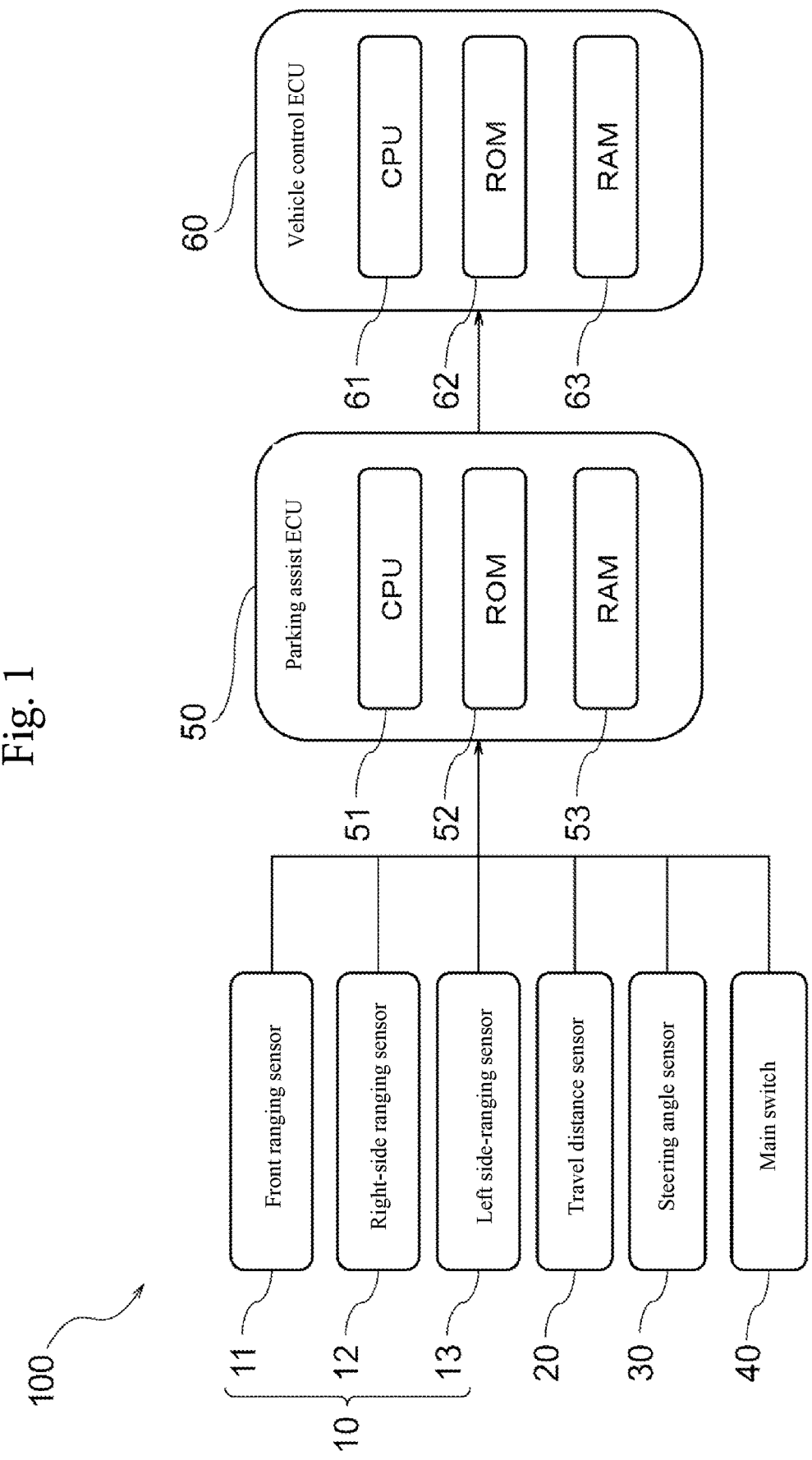
FIG. 1 is a block diagram illustrating the configuration of a parking assist device according to an embodiment of the present invention.

Hereinafter, one or more embodiments of the present invention will be described with reference to the drawings. FIG. 1 is a block diagram illustrating the configuration of a parking assist device 100 according to an embodiment of the present invention. The parking assist device 100 according to the present embodiment, which is equipped in a vehicle, assists an operation of moving (parking) the vehicle into a parking space. The parking assist device 100 according to the present embodiment comprises a set of ranging sensors 10, a travel distance sensor 20, a steering angle sensor 30, a main switch 40, a parking assist electronic control unit (ECU) 50, and a vehicle control ECU 60. The parking assist device 100 further comprises hardware modules, such as an engine control ECU and a power assist ECU (not illustrated), which are usually equipped in the vehicle. These components are connected to one another via a controller area network (CAN) or other in-vehicle LAN to mutually exchange information.

As illustrated in the figure, the set of ranging sensors 10 includes, for example, a front ranging sensor 11, a right-side ranging sensor 12, and a left side-ranging sensor 13. The front ranging sensor 11, which is provided at or in the vicinity of the front bumper of the vehicle, detects the polar coordinates (distances and orientations) of a cloud of reflection points (see FIG. 3) of an object existing ahead of the subject vehicle and outputs them to the parking assist ECU 50. The right-side ranging sensor 12, which is provided on the right side of the vehicle (e.g. at the front right part of the subject vehicle), detects the polar coordinates of a cloud of reflection points of an object existing on the right side of the subject vehicle and outputs them to the parking assist ECU 50. The left-side ranging sensor 13, which is provided on the left side of the vehicle (e.g. at the front left part of the subject vehicle), detects the polar coordinates of a cloud of reflection points of an object existing on the left side of the subject vehicle and outputs them to the parking assist ECU 50.

Examples of the ranging sensors 10 include laser scanners, radars, and stereo cameras. Any sensor can be employed as each ranging sensor, provided that it can detect the polar coordinates of a cloud of reflection points of an object. The detection area of the set of ranging sensors 10 is set so as to be able to detect the polar coordinates of clouds of reflection points of two or more parked vehicles that exist on at least the right and left of a pathway for the subject vehicle.

The travel distance sensor 20 calculates the movement amount of the subject vehicle and outputs it to the parking assist ECU 50. The travel distance sensor 20 can be configured, for example, using an appropriate sensor such as a rotation speed sensor that detects the rotation speed of one or more wheels of the subject vehicle.

The steering angle sensor 30, which is equipped inside the steering column, for example, detects the rotation angle of the steering wheel and outputs it to the parking assist ECU 50.

The main switch 40, which is a switch for a user to operate to input the start of parking assist, outputs an OFF signal to the parking assist ECU 50 when not operated and outputs an ON signal to the parking assist ECU 50 when operated. The main switch 40 is disposed, for example, on any position at which the driver can operate it, such as a position around the instrument panel or steering wheel of the subject vehicle. Examples of the main switch 40 also include a software switch presented on the screen of a navigation devise and a software switch presented on the screen of a portable terminal, such as a smartphone, which can communicate with the vehicle via a network.

The parking assist ECU 50 is a controller that comprehensively controls the parking assist device 100. The parking assist ECU 50 comprises a ROM 52 that stores a parking assist program, a CPU 51 as an operation circuit that executes the program stored in the ROM 52 to serve as the parking assist device 100 according to the present embodiment, and a RAM 53 that serves as an accessible storage device. The parking assist ECU 50, to which the detection information is input from the set of ranging sensors 10, the travel distance sensor 20, the steering angle sensor 30, and the main switch 40, executes an available parking space estimation process to be described later, then calculates a target vehicle speed and a target steering angle of the subject vehicle, and outputs them to the vehicle control ECU 60.

The vehicle control ECU 60 is a controller that performs drive control of the vehicle. The vehicle control ECU 60 comprises a ROM 62 that stores a vehicle drive control program, a CPU 61 as an operation circuit that executes the program stored in the ROM 62 to serve as a vehicle control device, and a RAM 63 that serves as an accessible storage device. The vehicle control ECU 60, to which the target vehicle speed and target steering angle of the vehicle are input from the parking assist ECU 50, performs the drive control of the vehicle in cooperation with the engine control ECU, the power assist ECU of the steering, etc.

Figure 2:
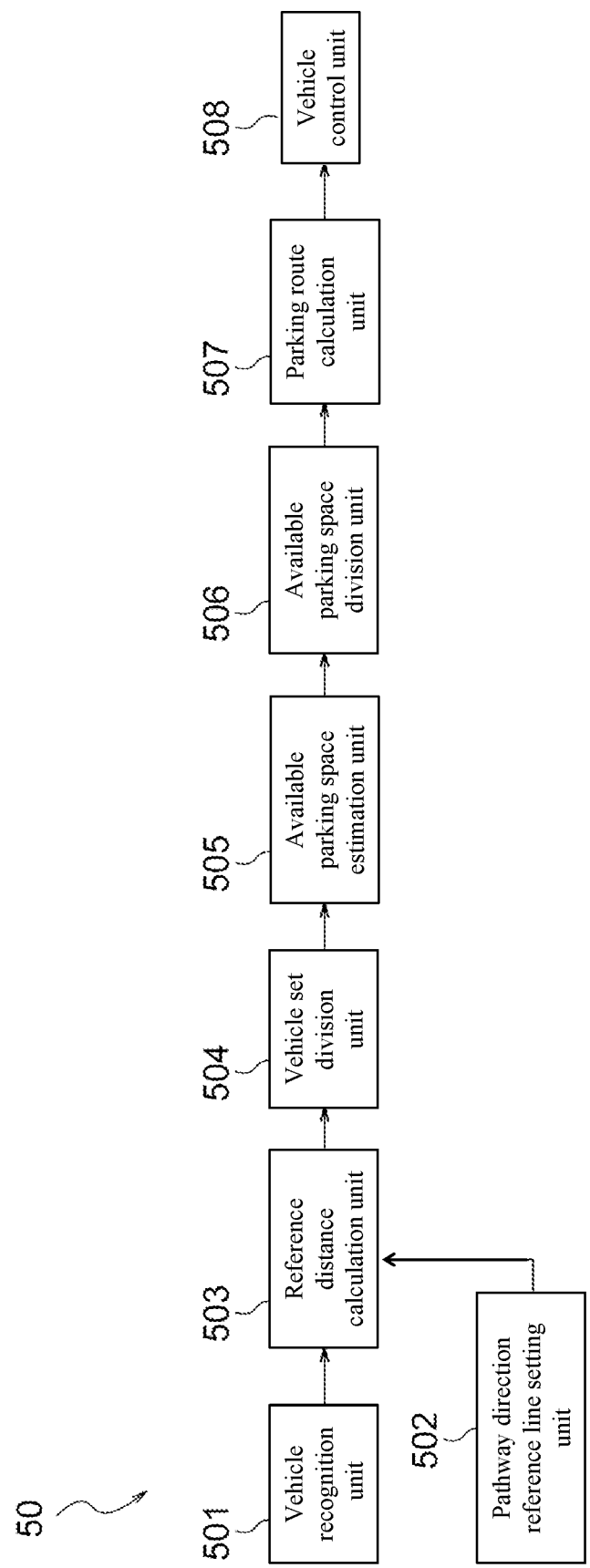
FIG. 2 is a block diagram for describing functions of a parking assist ECU of FIG. 1.

FIG. 2 is a block diagram for describing the functions of the parking assist ECU 50. As illustrated in the figure, the parking assist ECU 50 comprises a vehicle recognition unit 501, a pathway direction reference line setting unit 502, a reference distance calculation unit 503, a vehicle set division unit 504, an available parking space estimation unit 505, an available parking space division unit 506, a parking route calculation unit 507, and a vehicle control unit 508.

The vehicle recognition unit 501 recognizes parked vehicles 2 (see FIG. 3, etc.) on the basis of reflection point positional information groups (referred to as "point clouds," hereinafter) that are input as clouds of polar coordinates from the set of ranging sensors 10. The vehicle recognition unit 501 first performs coordinate conversion on the point clouds, which are input from the front ranging sensor 11, the right-side ranging sensor 12, and the left side-ranging sensor 13, from the polar coordinates to the xy-plane coordinates for integration and then performs clustering to extract point clouds of close points.

Figure 3:
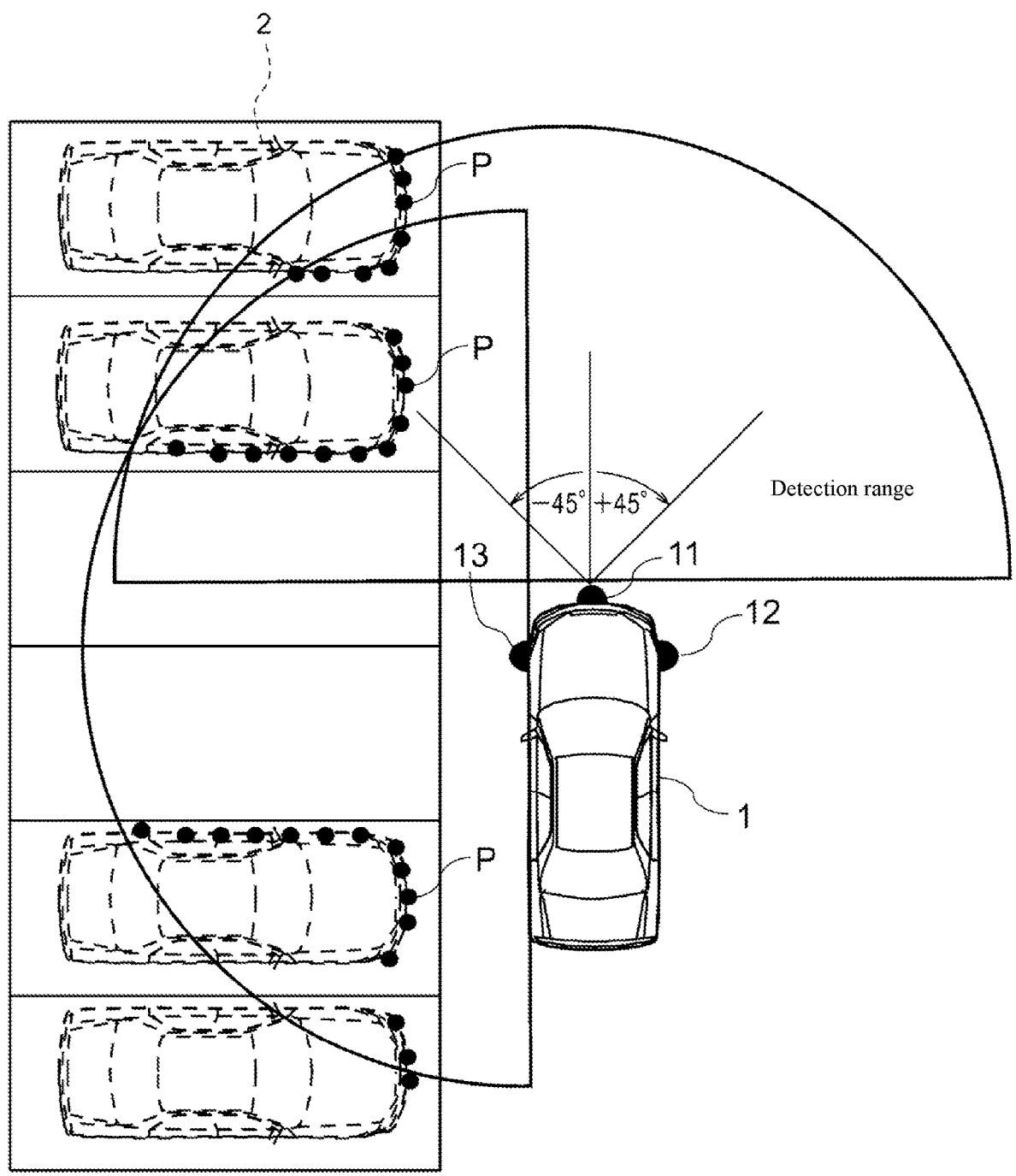
FIG. 3 is a plan view for describing a recognition process for parked vehicles according to an embodiment of the present invention.

FIG. 3 is a plan view for describing a recognition process for the parked vehicles 2. As illustrated in the figure, the parked vehicles 2 existing in the parking lot are each extracted as an L-shaped point cloud by the vehicle recognition unit 501. The method of recognizing the parked vehicles 2 is not limited to the above-described method, and other known methods can also be used.

Figure 4:
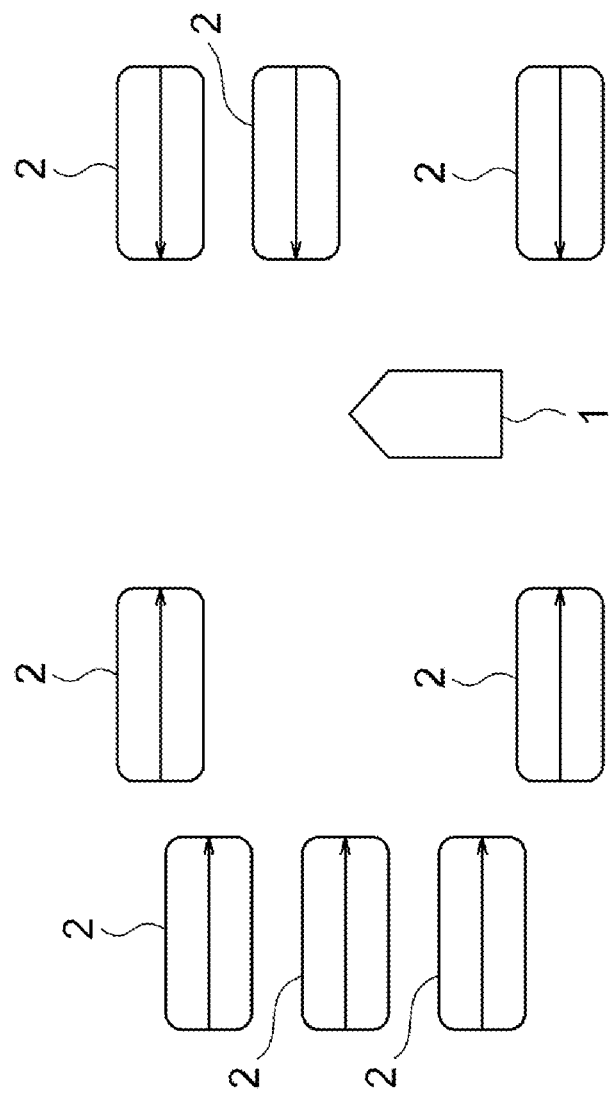
FIG. 4 is a plan view for describing a calculation process for the positions and directions of parked vehicles according to an embodiment of the present invention.

FIG. 4 is a plan view for describing a calculation process for the positions and directions of the parked vehicles 2. The vehicle recognition unit 501 calculates the positions and directions of the parked vehicles 2 on the basis of the information on the L-shaped point clouds which are extracted by clustering. For example, the vehicle recognition unit 501 calculates a representative point P (see FIG. 3) of each parked vehicle 2 on the basis of the information on the corresponding L-shaped point cloud and outputs the position of the calculated representative point P and the direction to the reference distance calculation unit 503 as the position and direction of the parked vehicle 2.

Here, one of the L-shaped pair of straight lines is a straight line representing the front face of a parked vehicle 2 parked in the backward direction or the rear face of a parked vehicle 2 parked in the forward direction while the other straight line is a straight line representing a side surface of the parked vehicle 2. As illustrated in FIG. 3, in a situation in which the vector indicating the direction of the subject vehicle 1 and the vector indicating the direction of a parked vehicle 2 are at a right angle, the front face of a parked vehicle 2 parked in the backward direction or the rear face of a parked vehicle 2 parked in the forward direction falls within a range from 45° on the left side to 45° on the right side with respect to the vector indicating the direction of the subject vehicle 1. The vehicle recognition unit 501 therefore extracts a straight line that falls within the range from 45° on the left side to 45° on the right side with respect to the vector indicating the direction of the subject vehicle 1 as a straight line representing the front face of a parked vehicle 2 parked in the backward direction or the rear face of a parked vehicle 2 parked in the forward direction. Then, the vehicle recognition unit 501 calculates the center point of the extracted straight line as the representative point P of the parked vehicle 2.

The vehicle recognition unit 501 calculates not only the position of the representative point P of a parked vehicle 2 but also the direction of the parked vehicle 2 on the basis of the direction of the straight line representing the front face or rear face of the parked vehicle 2 and the direction of the straight line representing the side surface of the parked vehicle 2 and outputs the information on the position of the representative point P of the parked vehicle 2 and the direction of the parked vehicle 2 to the reference distance calculation unit 503. It is not essential to set the representative point P of a parked vehicle 2 to the center of the front face or rear face of the parked vehicle 2, and the representative point P may be set to the same position for a plurality of parked vehicles 2. For example, the representative point P may be set to the right or left end of the front of a parked vehicle 2 or may also be set to the center (center of gravity) or the like of the parked vehicle 2.

Figure 5:
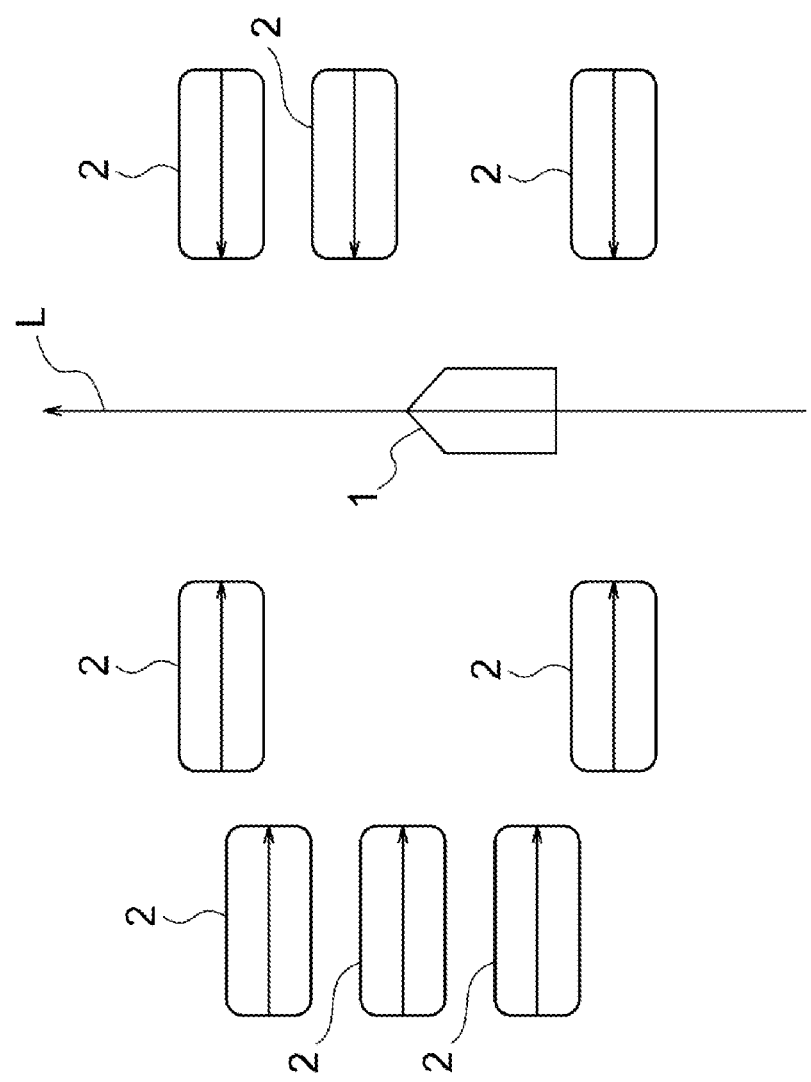
FIG. 5 is a plan view for describing a setting process for a pathway direction reference line according to an embodiment of the present invention.

FIG. 5 is a plan view for describing a setting process for a pathway direction reference line L. The pathway direction reference line setting unit 502 sets a pathway direction for the subject vehicle, sets the pathway direction reference line L, which is a straight line along the pathway direction, to the pathway for the subject vehicle 1, and outputs the pathway direction reference line L to the reference distance calculation unit 503. The pathway direction reference line L is a straight line that passes through an arbitrary point of the subject vehicle 1 (e.g. the above-described center of the front face of the subject vehicle 1).

An exemplary method of setting the pathway direction for the subject vehicle 1 may include making a histogram of a distribution of directions of the parked vehicles 2 recognized by the vehicle recognition unit 501 and determining a direction of a predetermined angle with respect to the direction which provides a peak among the above directions, as the pathway direction. This method can be applied to a case of preliminarily acquiring information on the angle between the pathway direction for the subject vehicle 1 and the direction of a parking frame. For example, in a case of preliminarily acquiring information indicating that the angle between the pathway direction for the subject vehicle 1 and the direction of a parking frame is 90°, the pathway direction to be set is a direction of 90° with respect to the direction which provides the peak among the directions of the parked vehicles 2.

Another exemplary method of setting the pathway direction for the subject vehicle 1 may include using a navigation system to acquire map data that includes the parking lot and performing the matching between the map data and the position of the subject vehicle 1 to detect the pathway direction for the subject vehicle 1. In addition or alternatively, information on the pathway direction for the subject vehicle 1 may be acquired through infrastructure systems such as a vehicle-infrastructure cooperative road traffic system and a vehicle-infrastructure cooperative safe driving assist system.

Figure 6:
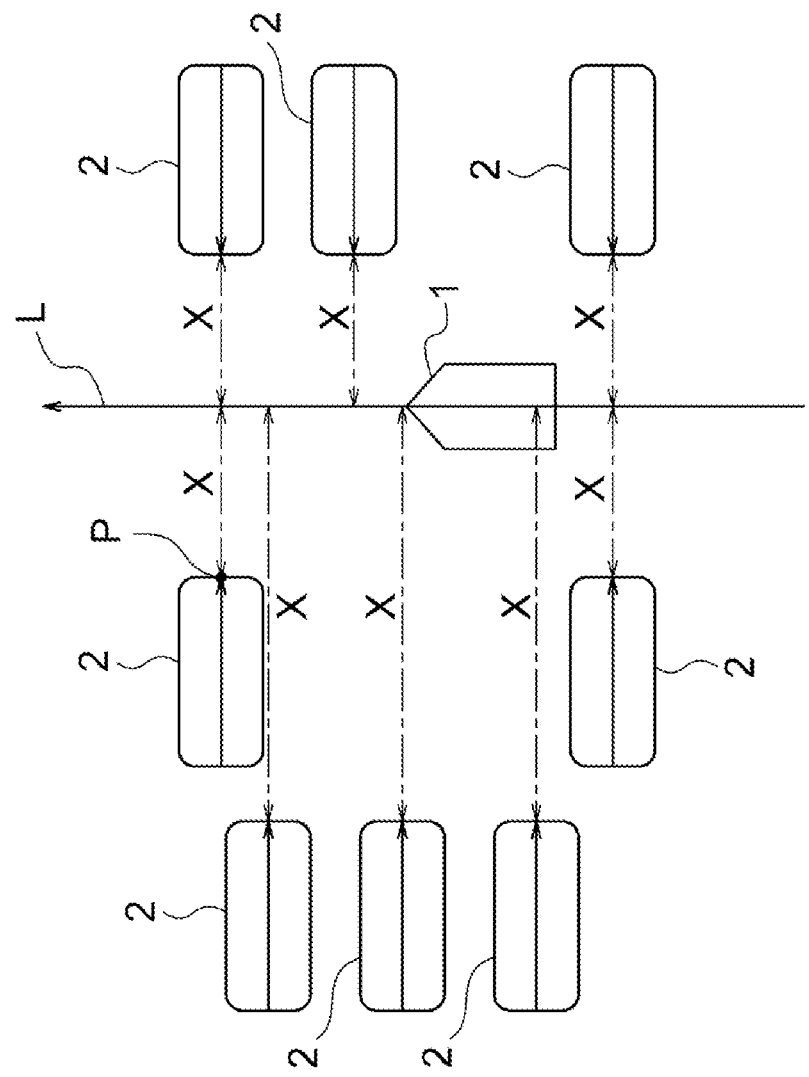
FIG. 6 is a plan view for describing a calculation process for reference distances according to an embodiment of the present invention.

FIG. 6 is a plan view for describing a calculation process for reference distances X. The reference distance calculation unit 503 calculates the reference distances X, which are distances between the positions of the representative points P of the parked vehicles 2 and the pathway direction reference line L, and relative positions of the parked vehicles 2 with respect to the pathway direction reference line L and outputs the calculated reference distances X and relative positions to the vehicle set division unit 504. When calculating the relative positions of the parked vehicles 2 with respect to the pathway direction reference line L, the reference distance calculation unit 503 calculates whether each parked vehicle 2 is located on the right side or left side of the pathway direction reference line L.

Figure 7:
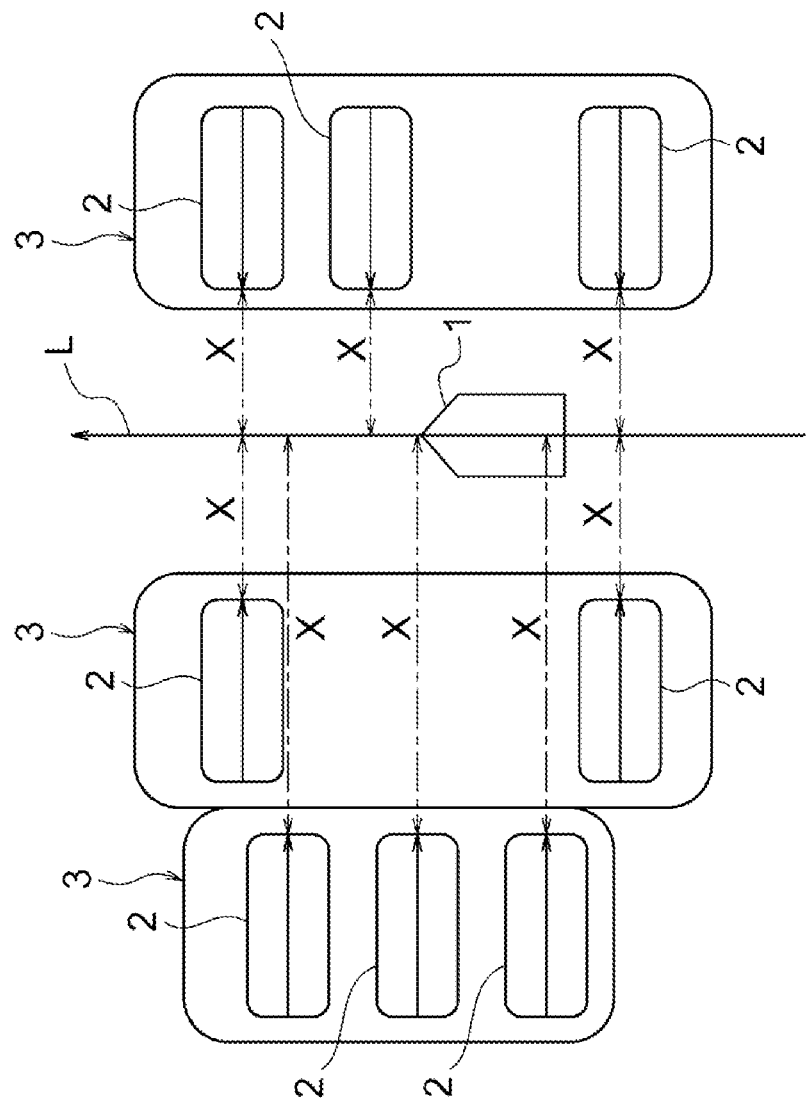
FIG. 7 is a plan view for describing a grouping process for a set of vehicles according to an embodiment of the present invention.

FIG. 7 is a plan view for describing a grouping process for a set of vehicles 3. The vehicle set division unit 504 groups two or more parked vehicles 2 that have comparable reference distances X and the same relative positions of the parked vehicles 2 with respect to the pathway direction reference line L into a set of vehicles 3 and outputs information on the set of vehicles 3 and the two or more parked vehicles 2 included in the set of vehicles 3 to the available parking space estimation unit 505.

Figure 8:
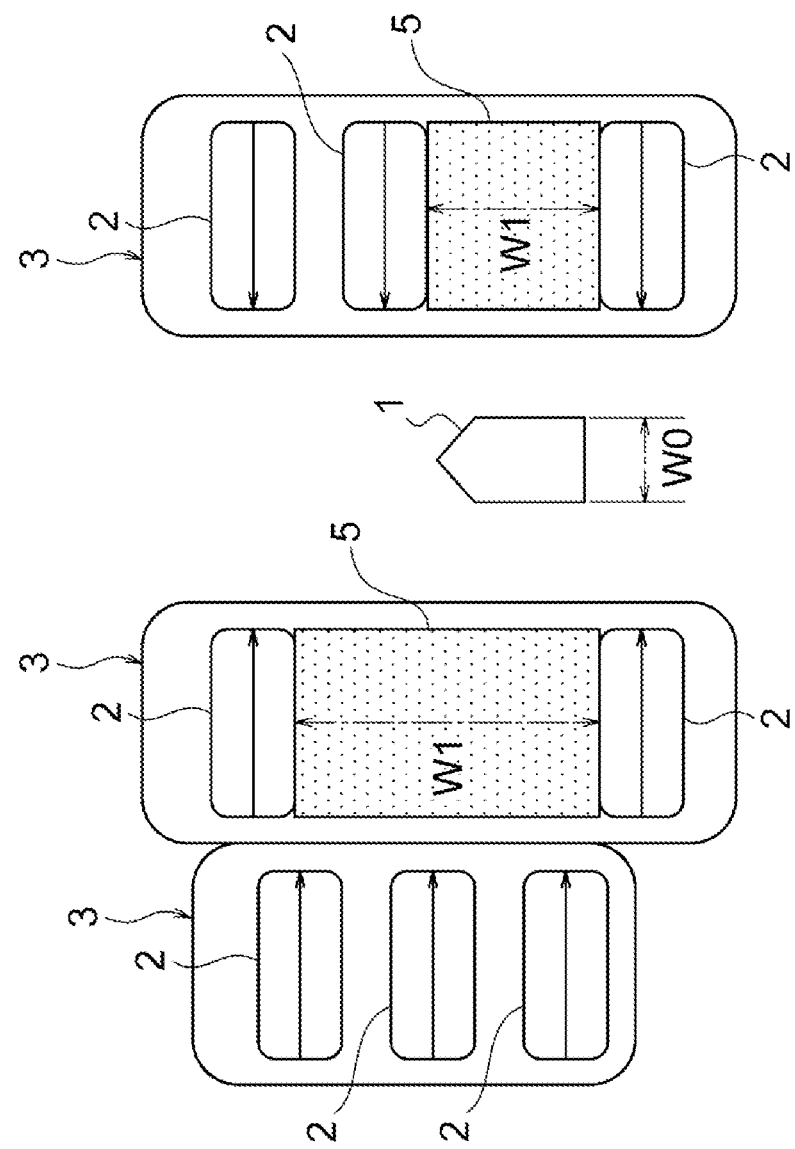
FIG. 8 is a plan view for describing an estimation process for an available parking space according to an embodiment of the present invention.

FIG. 8 is a plan view for describing an estimation process for an available parking space 5. First, when there are two or more sets of vehicles 3, the available parking space estimation unit 505 selects one or more sets of vehicles 3 that are closest to the subject vehicle 1, from among the two or more sets of vehicles 3. As will be understood, when there is only one set of vehicles 3, the available parking space estimation unit 505 consequently selects the one set of vehicles 3. Then, the available parking space estimation unit 505 calculates an inter-vehicle distance W1 of adjacent parked vehicles 2 in the selected one or more sets of vehicles 3.

Here, in the case of a right-angle parking scheme as illustrated in FIG. 8 rather than an angle parking scheme, the inter-vehicle distance W1 and a width W0 of the subject vehicle 1 satisfy the relationship of Expression (1) as below (i.e. a relationship in which the inter-vehicle distance W1 is larger than the width W0 of the subject vehicle 1). Accordingly, when the calculated inter-vehicle distance W1 and the width W0 of the subject vehicle 1 satisfy the relationship of Expression (1), the available parking space estimation unit 505 estimates a space in which the inter-vehicle distance W1 satisfies the relationship of Expression (1) as the available parking space 5 and outputs the estimation result to the available parking space division unit 506. The method of estimating the available parking space 5 may be carried out on the basis of the point cloud information acquired by radar or may also be carried out on the basis of the recognition result obtained by a camera.

$$W1 > W0 \tag{1}$$

The available parking space estimation unit 505 sets the available parking space 5 so that the available parking space 5 includes at least an area onto which one of the parked vehicles 2 located on both sides of the available parking space 5 (for example, a parked vehicle 2 having a longer total length) is projected in the vehicle width direction.

Figure 9:
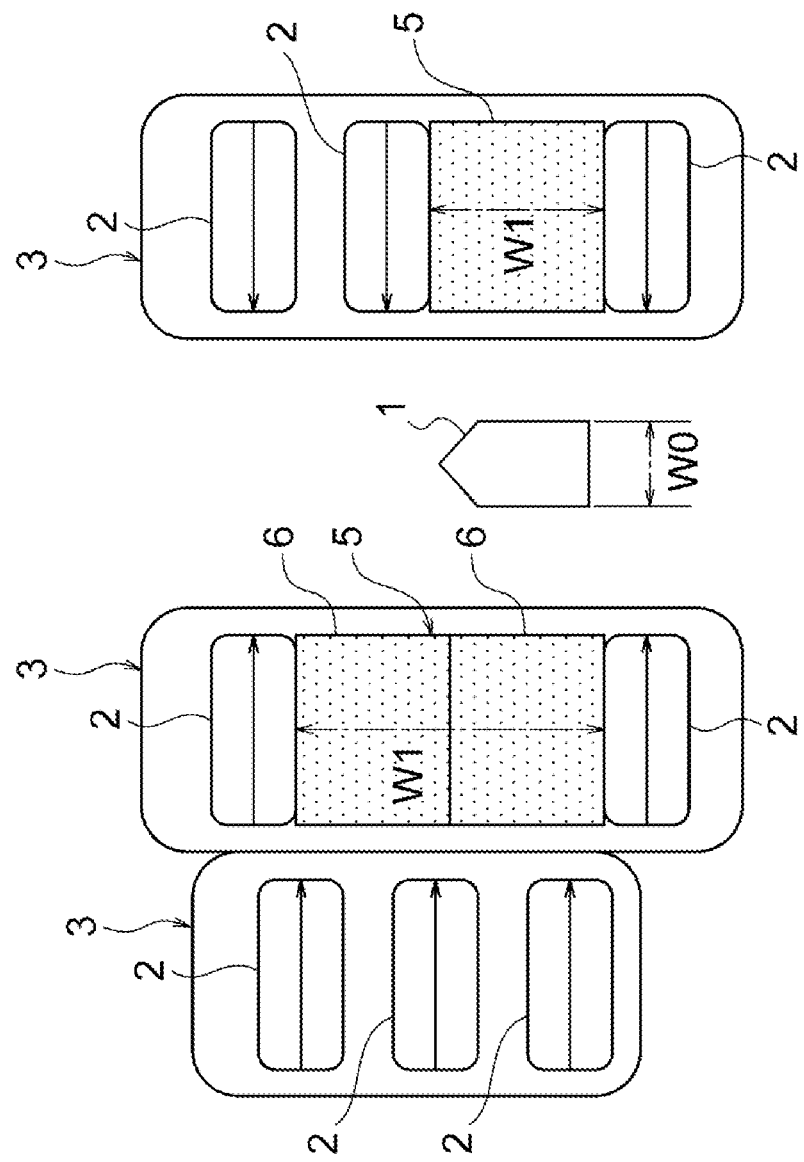
FIG. 9 is a plan view for describing a division process for an available parking space according to an embodiment of the present invention.

FIG. 9 is a plan view for describing a division process for the available parking space 5. The available parking space division unit 506 calculates whether the width W1 of the estimated available parking space 5 corresponds to n times (n is an integer) a preliminarily set width W2 of a parking frame, as represented by Expression (2) as below. For example, when the width W1 of the estimated available parking space 5 is 6 m and the preliminarily set width W2 of a parking frame is 2.5 m, the width W1 of the available parking space 5 corresponds to twice (n=2) the width W2 of the parking frame.

$$n = W1/W2 \tag{2}$$

Then, the available parking space division unit 506 divides the available parking space 5 in the width direction (direction parallel to the pathway direction) by the integer n represented by the above Expression (2) and outputs information on the divided available parking space 5 to the parking route calculation unit 507. In the following description, the n available parking spaces included in the available parking space 5 are referred to as available parking subspaces 6.

When the information on the available parking space 5 is input from the available parking space division unit 506, the parking route calculation unit 507 calculates a parking route to each available parking subspace 6. The method of calculating the parking route is not particularly limited, and various known methods can be used. When the n available parking subspaces 6 include an available parking subspace 6 that is set to be unselected by the user of the subject vehicle 1, the parking route to the available parking subspace 6 is not calculated. This can reduce the calculation load.

When calculating the parking route, the parking route calculation unit 507 first sets a parking target position in each available parking subspace 6. In an exemplary method of setting the parking target position, the parking target position may be set to a position at which the center points in the longitudinal direction and width direction of the selected available parking subspace 6 coincide with the center points in the longitudinal direction and width direction of the subject vehicle 1. Then, the parking route calculation unit 507 calculates a parking route to the parking target position in each available parking subspace 6.

When calculating the parking route, the parking route calculation unit 507 may select one available parking subspace 6 from among the n available parking subspaces 6 included in the available parking space 5 and calculate the parking route to the selected available parking subspace 6. In an exemplary method of selecting one available parking subspace 6 from among the n available parking subspaces 6, an available parking subspace 6 closest to the subject vehicle 1 may be selected.

The vehicle control unit 508 calculates a vehicle control command value for traveling along the parking route input from the parking route calculation unit 507 and outputs the vehicle control command value to the vehicle control ECU 60. Examples of the vehicle control command value include the target vehicle speed and the target steering angle, for example, but other command values such as the acceleration of the subject vehicle may be included in the vehicle control command value. The method of calculating the vehicle control command value is not particularly limited, and various known methods can be used.

Figure 10:
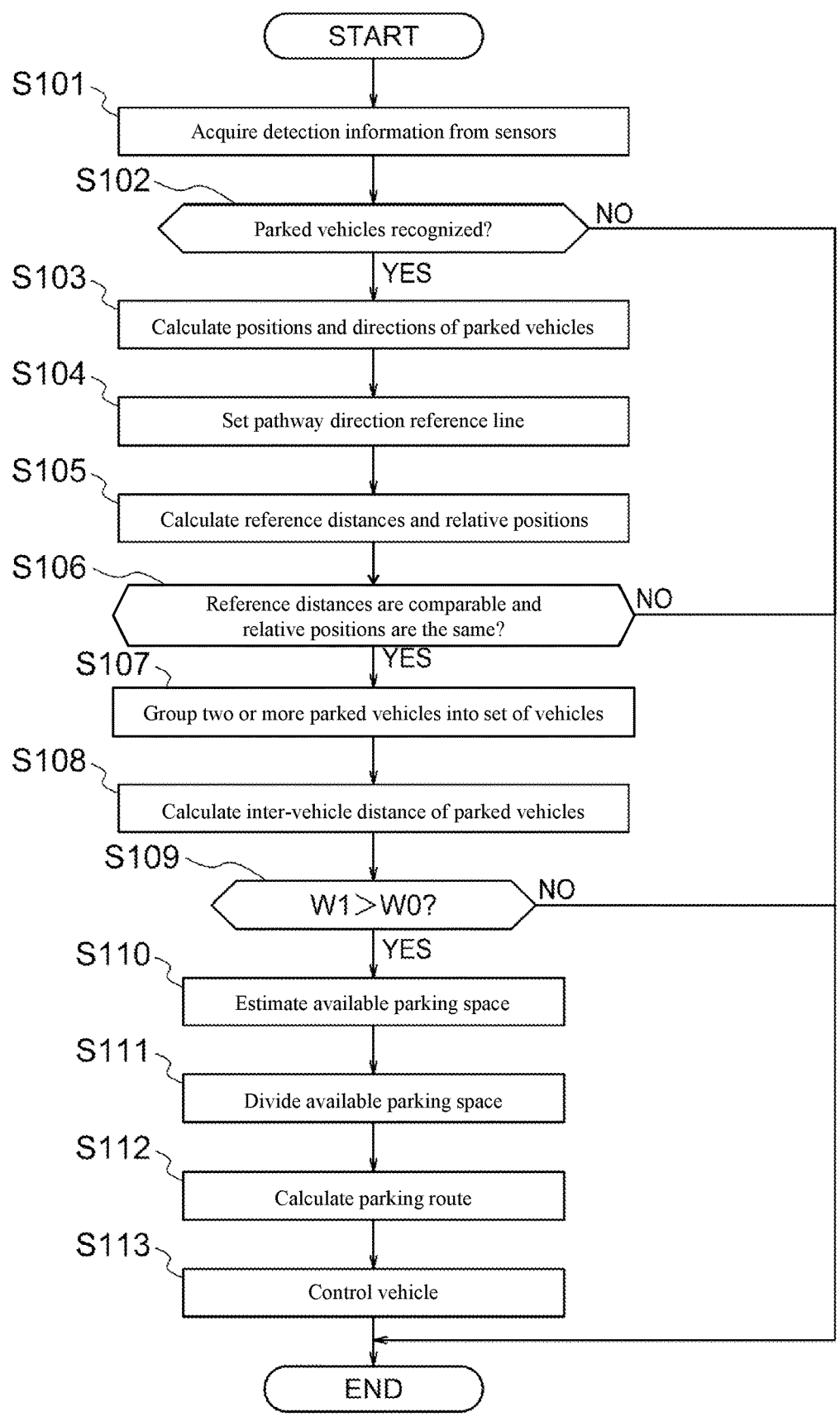
FIG. 10 is a flowchart illustrating the control procedure of a parking assist process executed by the parking assist device according to an embodiment of the present invention.

FIG. 10 is a flowchart illustrating the control procedure of a parking assist process executed by the parking assist device 100 according to the present embodiment. In the present embodiment, when an ON signal is input from the main switch 40 to the parking assist ECU 50, the parking assist process is started, which is followed by step S101.

In step S101, detection information from the set of ranging sensors 10, the travel distance sensor 20, and the steering angle sensor 30 is input to the parking assist ECU 50. Then, in step S102, the vehicle recognition unit 501 executes a process of recognizing the parked vehicles on the basis of the information on the point clouds which is input as clouds of polar coordinates from the set of ranging sensors 10 (see FIG. 3). When the parked vehicles 2 are recognized in step S102, the routine transitions to step S103, while when no parked vehicles 2 are recognized in step S102, the parking assist process is concluded.

In step S103, the vehicle recognition unit 501 calculates the positions and directions of the parked vehicles 2 on the basis of the information on the L-shaped point clouds extracted by clustering and outputs the positions and directions of the parked vehicles 2 to the reference distance calculation unit 503 (see FIG. 4). Then, in step S104, the pathway direction reference line setting unit 502 sets the pathway direction reference line L on the pathway for the subject vehicle 1 and outputs the pathway direction reference line L to the reference distance calculation unit 503 (see FIG. 5). Then, in step S105, the reference distance calculation unit 503 calculates the above reference distances X and the relative positions of the parked vehicles 2 with respect to the pathway direction reference line L and outputs the calculated reference distances X and relative positions of the parked vehicles 2 to the vehicle set division unit 504 (see FIG. 6).

Then, in step S106 and step S107, the vehicle set division unit 504 executes a process of grouping two or more parked vehicles 2 into a set of vehicles 3 (see FIG. 7). First, in step S106, the vehicle set division unit 504 determines whether or not there are two or more parked vehicles 2 that have comparable reference distances X and the same relative positions of the parked vehicles 2 with respect to the pathway direction reference line L. When an affirmative determination is made in step S106, the routine transitions to step S107, while when a negative determination is made in step S106, the parking assist process is concluded. In step S107, the vehicle set division unit 504 groups the two or more parked vehicles 2 that have comparable reference distances X and the same relative positions of the parked vehicles 2 with respect to the pathway direction reference line L into a set of vehicles 3 and outputs information on the set of vehicles 3 and the two or more parked vehicles 2 included in the set of vehicles 3 to the available parking space estimation unit 505.

Then, in step S108 and step S109, the available parking space estimation unit 505 executes the estimation process for an available parking space 5 (see FIG. 8). First, in step S108, the available parking space estimation unit 505 selects one or more sets of vehicles 3 that are closest to the subject vehicle 1 and calculates an inter-vehicle distance W1 of adjacent parked vehicles 2 in the selected one or more sets of vehicles 3. Then, in step S109, the available parking space estimation unit 505 determines whether or not the calculated inter-vehicle distance W1 and the width W0 of the subject vehicle 1 satisfy the relationship of the above Expression (1). When an affirmative determination is made in step S109, the routine transitions to step S110, while when a negative determination is made in step S109, the parking assist process is concluded.

In step S110, the available parking space estimation unit 505 estimates an area in which the inter-vehicle distance W1 and the width W0 of the subject vehicle 1 satisfy the relationship of the above Expression (1) as the available parking space 5 and outputs the estimation result to the available parking space division unit 506. Then, in step S111, the available parking space division unit 506 divides the available parking space 5 in the width direction by the integer n represented by the above Expression (2) and outputs information on the divided available parking space 5 to the parking route calculation unit 507 (see FIG. 9). In the case of n=1, division of the available parking space 5 is consequently not executed.

Then, in step S112, the parking route calculation unit 507 calculates a parking route to each available parking subspace 6. Then, in step S113, the vehicle control unit 508 calculates a vehicle control command value for traveling along the parking route, which is input from the parking route calculation unit 507, and outputs the vehicle control command value to the vehicle control ECU 60. The vehicle control ECU 60 executes the drive control for the subject vehicle 1 in accordance with the vehicle control command value which is input from the vehicle control unit 508. The parking assist process is thus completed.

In the above-described control procedure of the parking assist process, after the parking route to the available parking subspace 6 is calculated, the parking operation is executed to complete the parking assist process, but the present invention is not limited to this, and the routine may return from step S113 to step S102 to sequentially correct the parking route.

In the above-described control procedure of the parking assist process, when the inter-vehicle distance W1 of the parked vehicles 2 in the grouped set of vehicles 3 is larger than the width W0 of one vehicle, the available parking space 5 is estimated between the parked vehicles 2. In an alternative embodiment, when the inter-vehicle distance W1 of the parked vehicles 2 in the set of vehicles 3 is larger than the width W0 of one vehicle and a space having a longitudinal length longer than the length of one vehicle exists between the parked vehicles 2 in the set of vehicles 3, the available parking space 5 may be estimated between the parked vehicles 2. In this case, the position in the longitudinal direction of the subject vehicle 1 parked in the available parking space 5 can be aligned with the positions in the longitudinal direction of other parked vehicles 2, and the subject vehicle 1 parked in the available parking space 5 can be prevented from protruding out of the parking frame.

As described above, in the parking assist method and parking assist device 100 according to the present embodiment, the recognition information on the parked vehicles 2 existing in the parking lot is acquired from the set of ranging sensors 10, two or more vehicles parked side by side are extracted from the above recognition information and grouped into a set of vehicles 3, and the available parking space 5 is estimated between the parked vehicles 2 included in the set of vehicles 3. This allows the available parking space to be estimated even when a white line representing a parking frame cannot be recognized for some reasons, such as that no white line exists or the white line is unclear.

In the parking assist method and parking assist device 100 according to the present embodiment, the pathway direction reference line L extending along the pathway of the parking lot is set, the reference distances X between the pathway direction reference line L and the parked vehicles 2 included in the recognition information acquired from the set of ranging sensors 10 are calculated, and two or more vehicles are grouped into a set of vehicles 3 on the basis of the reference distances X. Through this operation, two or more parked vehicles 2 parked side by side along the pathway of the parking lot can be grouped into a set of vehicles 3.

In the parking assist method and parking assist device 100 according to the present embodiment, when a space in which the inter-vehicle distance W1 is larger than the width W0 of one vehicle exists between the parked vehicles 2 included in the grouped set of vehicles 3, the space is estimated as an available parking space 5. This allows at least one vehicle to be parked in the available parking space 5 existing in an area of the grouped set of vehicles 3.

In the parking assist method and parking assist device 100 according to the present embodiment, when the inter-vehicle distance W1 of the parked vehicles 2 located on both sides of the available parking space 5 is larger than a value obtained by multiplying the predetermined width W2 of a parking frame by an integer n larger than one, the available parking space 5 is divided by the integer n in the arrangement direction of the parked vehicles 2 in the set of vehicles 3. This allows at least n vehicles to be parked in the available parking space 5 existing in an area of the grouped set of vehicles 3.

In the parking assist method and parking assist device 100 according to the present embodiment, the parking route to the available parking space 5 is generated and the subject vehicle 1 is controlled to travel along the parking route. This allows execution of the automated parking without requiring the operation by the driver.

Figure 11:
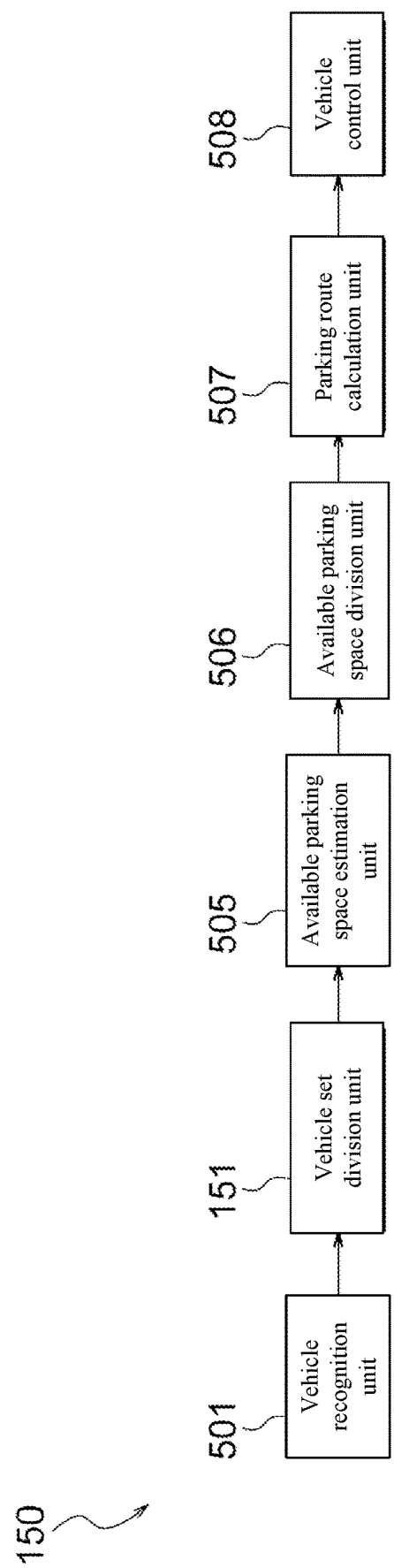
FIG. 11 is a block diagram for describing functions of a parking assist ECU according to another embodiment of the present invention.

FIG. 11 is a block diagram for describing the functions of a parking assist ECU 150 according to another embodiment of the present invention. As illustrated in the figure, the parking assist ECU 150 comprises a vehicle recognition unit 501, a vehicle set division unit 151, an available parking space estimation unit 505, an available parking space division unit 506, a parking route calculation unit 507, and a vehicle control unit 508. Description of the same functions as those of the parking assist ECU 50 according to the above embodiment will be omitted, and the description of the above embodiment is borrowed herein.

Figure 12:
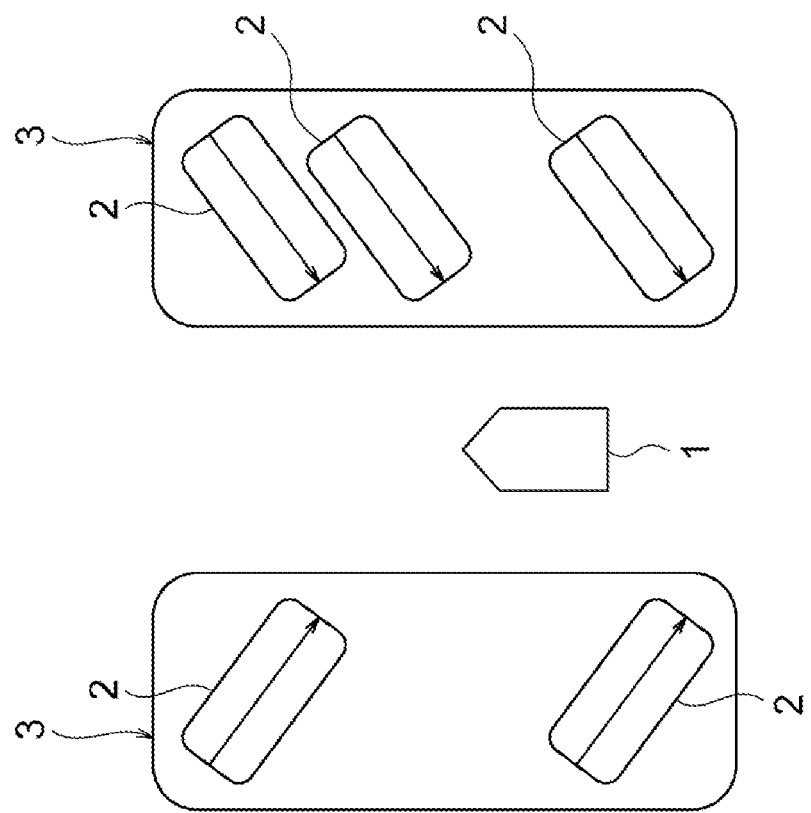
FIG. 12 is a plan view for describing a grouping process for a set of vehicles according to another embodiment of the present invention.

FIG. 12 is a plan view for describing a grouping process for a set of vehicles 3. The vehicle set division unit 151 groups two or more parked vehicles 2 that have comparable directions (for example, the angle difference is within ±0-10°) into a set of vehicles 3 and outputs information on the set of vehicles 3 and the two or more parked vehicles 2 included in the set of vehicles 3 to the available parking space estimation unit 505.

Figure 13:
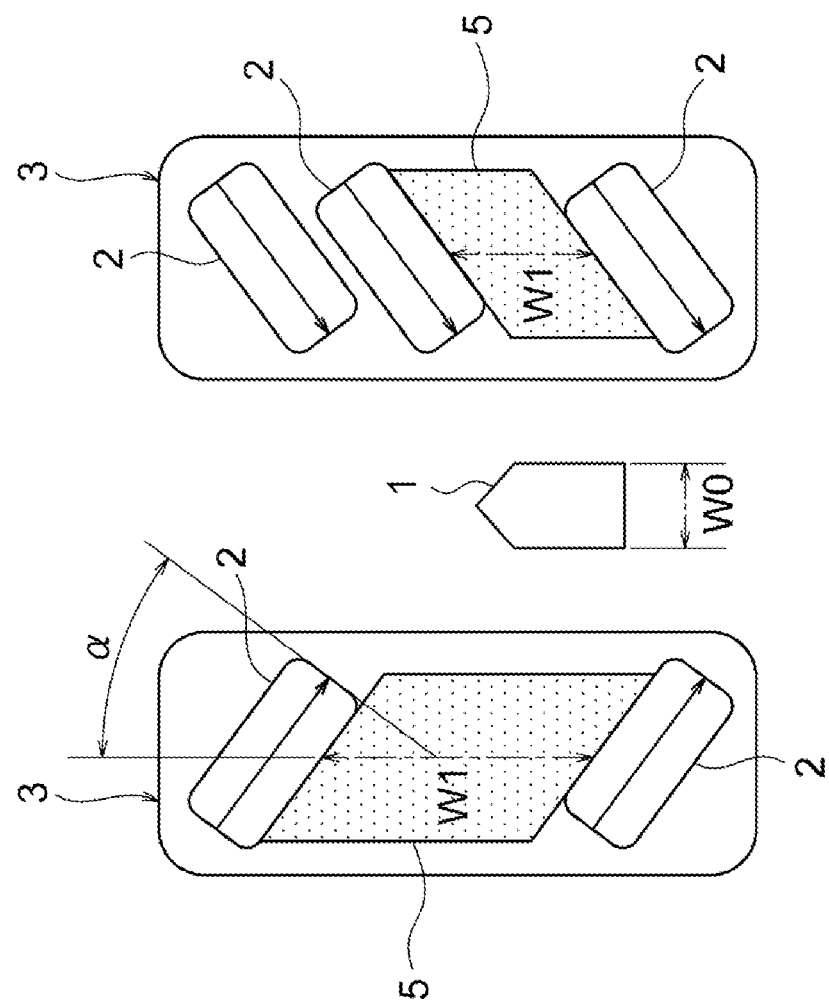
FIG. 13 is a plan view for describing an estimation process for an available parking space according to another embodiment of the present invention.

FIG. 13 is a plan view for describing an estimation process for an available parking space 5. First, when there are two or more sets of vehicles 3, the available parking space estimation unit 505 selects one or more sets of vehicles 3 that are closest to the subject vehicle 1, from among the two or more sets of vehicles 3. Then, the available parking space estimation unit 505 calculates an inter-vehicle distance W1 of adjacent parked vehicles 2 in the selected one or more sets of vehicles 3.

Then, when the calculated inter-vehicle distance W1 and the width W0 of the subject vehicle 1 satisfy the relationship of Expression (3) as below, the available parking space estimation unit 505 estimates an area in which the inter-vehicle distance W1 satisfies the relationship of Expression (3) as the available parking space 5 and outputs the estimation result to the available parking space division unit 506.

$$W1 > W0/\cos\alpha \tag{3}$$

where α represents an angle between a straight line perpendicular to the longitudinal direction of the parked vehicles 2 and a straight line parallel to the pathway direction.

Here, in the case of a right-angle parking scheme as illustrated in FIG. 8 rather than an angle parking scheme, the angle α between the straight line perpendicular to the longitudinal direction of the parked vehicles 2 and the straight line parallel to the pathway direction is 0° because the width direction of a parking frame and the arrangement direction of the parking frames are parallel to each other. In such a case, therefore, the available parking space estimation unit 505 estimates the available parking space 5 in a situation in which the inter-vehicle distance W1 and the width W0 of the subject vehicle 1 satisfy the above Expression (1).

On the other hand, in the case of an angle parking scheme as illustrated in FIG. 13, the angle between the width direction of a parking frame and the arrangement direction of the parking frames is a certain angle α (0°<α<90°). In such a case, therefore, the available parking space estimation unit 505 estimates the available parking space 5 in a situation in which the inter-vehicle distance W1 and the width W0 of the subject vehicle 1 satisfy the above Expression (3).

The available parking space 5 is set so as to include at least an area onto which one of the parked vehicles 2 located on both sides of the available parking space 5 (for example, a parked vehicle 2 having a longer total length) is projected in the vehicle width direction.

Figure 14:
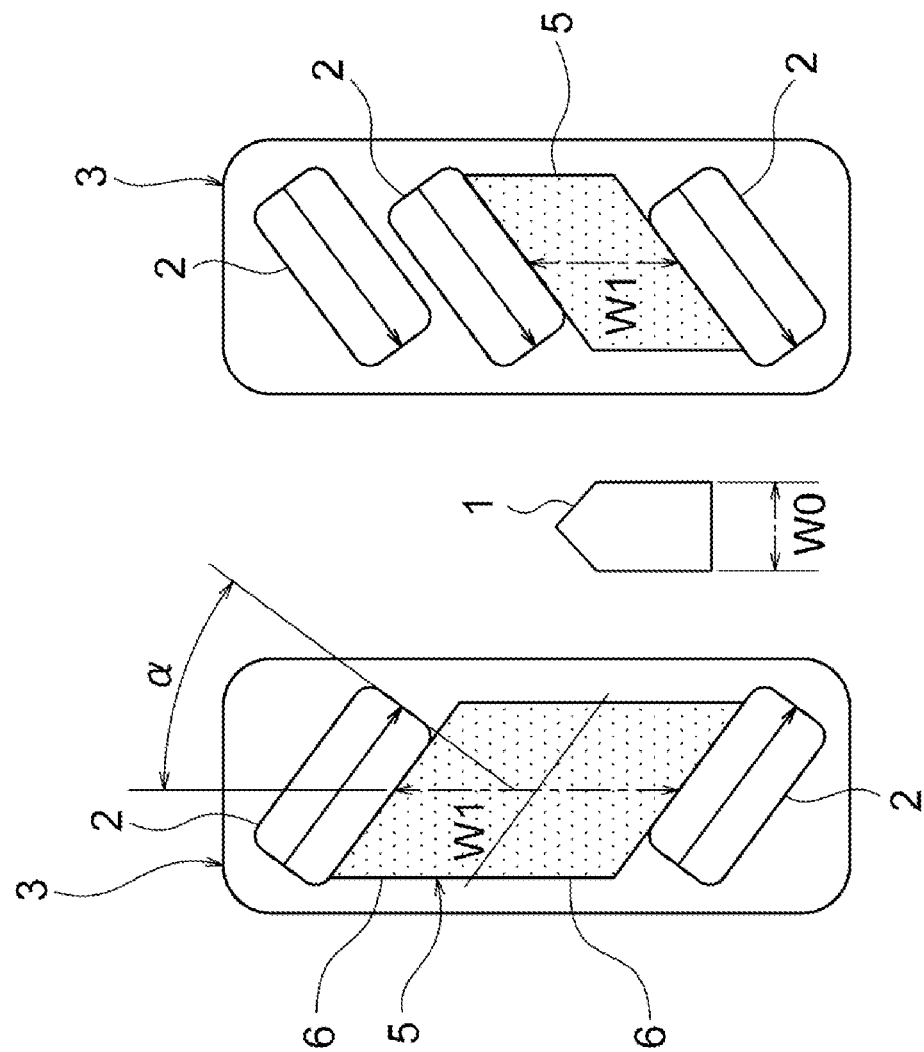
FIG. 14 is a plan view for describing a division process for an available parking space according to another embodiment of the present invention.

FIG. 14 is a plan view for describing a division process for the available parking space 5. The available parking space division unit 506 calculates whether the width W1 of the estimated available parking space 5 corresponds to n times (n is an integer) the value W2/cos α, as represented by Expression (4) as below:

$$n = W1/(W2/\cos \alpha) \quad (4)$$

where α represents an angle between a straight line perpendicular to the longitudinal direction of the parked vehicles 2 and a straight line parallel to the pathway direction, and W2 represents a preliminarily set width of a parking frame.

In the case of a right-angle parking scheme as illustrated in FIG. 9 rather than an angle parking scheme, the angle α between the straight line perpendicular to the longitudinal direction of the parked vehicles 2 and the straight line parallel to the pathway direction is 0° because the width direction of a parking frame and the arrangement direction of the parking frames are parallel to each other. In such a case, therefore, the available parking space division unit 506 calculates whether the width W1 of the estimated available parking space 5 corresponds to n times (n is an integer) the preliminarily set width W2 of a parking frame, as represented by the above Expression (2).

On the other hand, in the case of an angle parking scheme as illustrated in FIG. 14, the angle between the width direction of a parking frame and the arrangement direction of the parking frames is a certain angle α (0°<α<90°). In such a case, therefore, the available parking space division unit 506 calculates whether the width W1 of the estimated available parking space 5 corresponds to n times (n is an integer) the value W2/cos α, as represented by the above Expression (4).

Then, the available parking space division unit 506 divides the available parking space 5 in the width direction (direction parallel to the pathway direction) by the integer n represented by the above Expression (4) and outputs information on the divided available parking space 5 to the parking route calculation unit 507.

Figure 15:
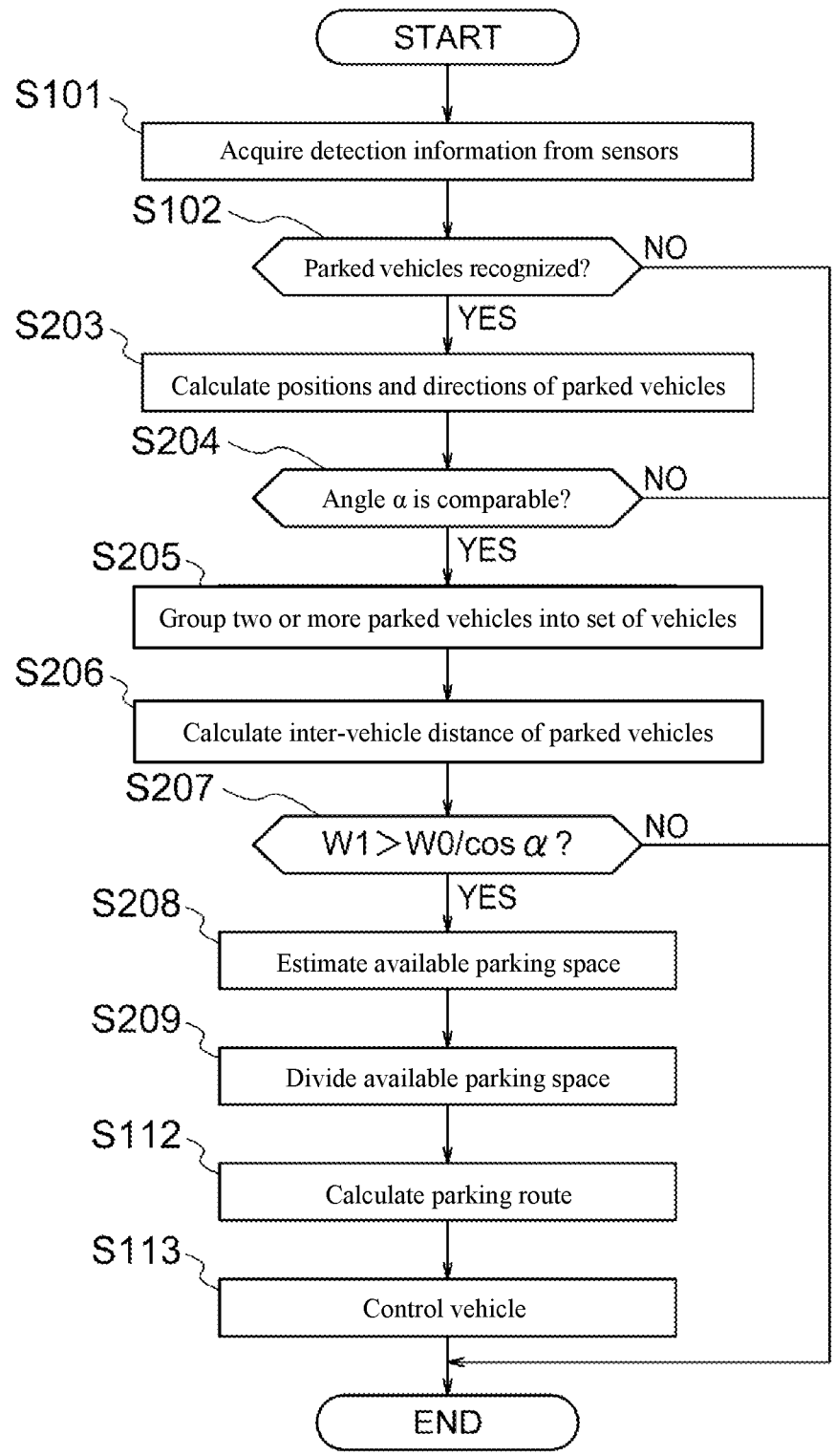
FIG. 15 is a flowchart illustrating the control procedure of a parking assist process according to another embodiment of the present invention.

FIG. 15 is a flowchart illustrating the control procedure of a parking assist process according to the present embodiment. In the present embodiment, when an ON signal is input from the main switch 40 to the parking assist ECU 150, the parking assist process is started, which is followed by step S101.

Steps S101 and S102 are executed in the same manner as in the parking assist process of the above-described embodiment. Then, in step S203, the vehicle recognition unit 501 calculates the positions and directions of the parked vehicles 2 on the basis of the information on the L-shaped point clouds extracted by clustering and outputs the positions and directions of the parked vehicles 2 to the vehicle set division unit 151 (see FIG. 4).

Then, in step S204 and step S205, the vehicle set division unit 151 executes a process of grouping two or more parked vehicles 2 into a set of vehicles 3 (see FIG. 13). First, in step S204, the vehicle set division unit 151 determines whether or not there are two or more parked vehicles 2 of which the angle α between the straight line perpendicular to the longitudinal direction of the parked vehicles 2 and the straight line parallel to the pathway direction is comparable. When an affirmative determination is made in step S204, the routine transitions to step S205, while when a negative determination is made in step S204, the parking assist process is concluded. In step S205, the vehicle set division unit 151 groups the two or more parked vehicles 2 of which the above angle α is comparable into a set of vehicles 3 and outputs information on the set of vehicles 3 and the two or more parked vehicles 2 included in the set of vehicles 3 to the available parking space estimation unit 505.

Then, in step S206 and step S207, the available parking space estimation unit 505 executes the estimation process for an available parking space 5 (see FIG. 14). First, in step S206, the available parking space estimation unit 505 selects one or more sets of vehicles 3 that are closest to the subject vehicle 1 and calculates an inter-vehicle distance W1 of adjacent parked vehicles 2 of the selected one or more sets of vehicles 3. Then, in step S207, the available parking space estimation unit 505 determines whether or not the calculated inter-vehicle distance W1 and the width W0 of the subject vehicle 1 satisfy the relationship of the above Expression (3). When an affirmative determination is made in step S207, the routine transitions to step S208, while when a negative determination is made in step S207, the parking assist process is concluded.

In step S208, the available parking space estimation unit 505 estimates a space in which the inter-vehicle distance W1 and the width W0 of the subject vehicle 1 satisfy the relationship of the above Expression (3) as the available parking space 5 and outputs the estimation result to the available parking space division unit 506. Then, in step S209, the available parking space division unit 506 divides the available parking space 5 in the width direction by the integer n represented by the above Expression (4) and outputs information on the divided available parking space 5 to the parking route calculation unit 507 (see FIG. 14). In the case of n=1, division of the available parking space 5 is consequently not executed.

Then, steps S112 and S113 are executed in the same manner as in the parking assist process of the above-described embodiment. The parking assist process in the present embodiment is thus completed.

In the above-described control procedure of the parking assist process, after the parking route to the available parking subspace 6 is calculated, the parking operation is executed to complete the parking assist process, but the present invention is not limited to this, and the routine may return from step S113 to step S102 to sequentially correct the parking route.

As described above, in the parking assist method and parking assist device according to the present embodiment, directions of the parked vehicles 2 included in the recognition information from the set of ranging sensors 10 are detected, and two or more vehicles are grouped into a set of vehicles 3 on the basis of the detected directions of the parked vehicles 2. Through this operation, two or more parked vehicles 2 parked side by side along the pathway of the parking lot can be grouped into a set of vehicles 3 both in the parking lot of a right-angle parking scheme and in the parking lot of an angle parking scheme.

Figure 16:
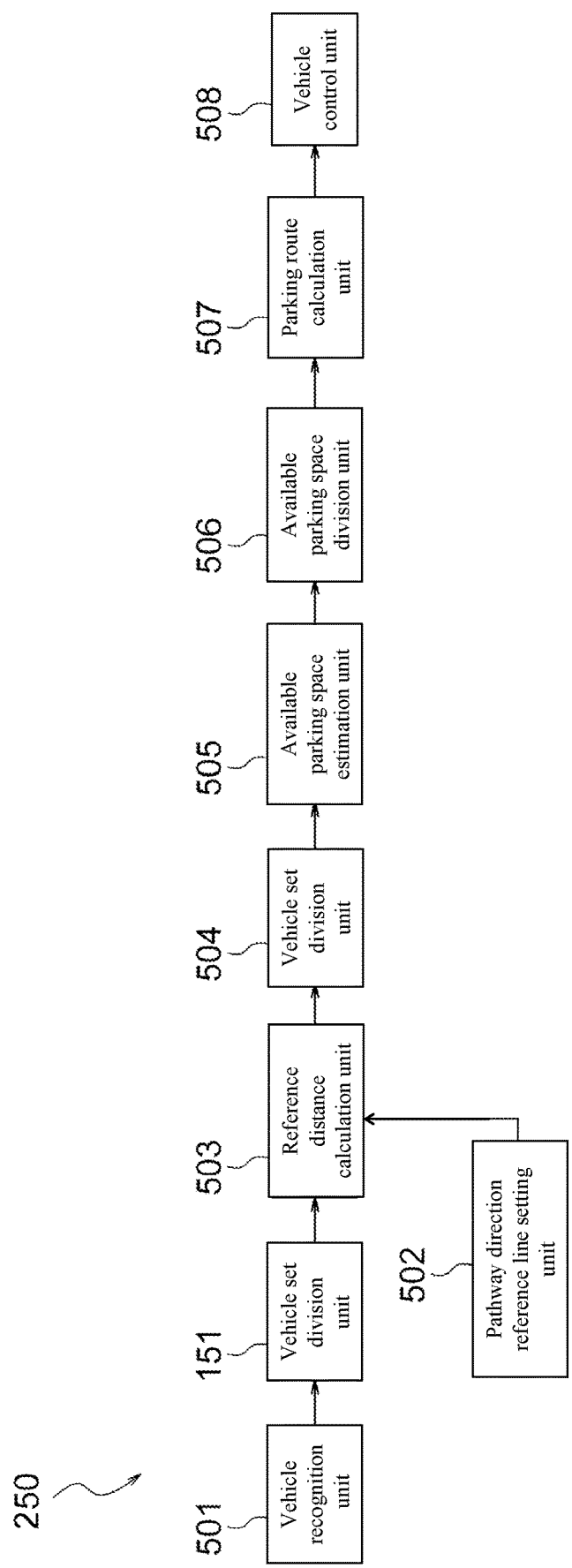
FIG. 16 is a block diagram for describing functions of a parking assist ECU according to another embodiment of the present invention.

FIG. 16 is a block diagram for describing the functions of a parking assist ECU 250 according to another embodiment of the present invention. As illustrated in the figure, the parking assist ECU 250 comprises a vehicle recognition unit 501, a vehicle set division unit 151, a pathway direction reference line setting unit 502, a reference distance calculation unit 503, a vehicle set division unit 504, an available parking space estimation unit 505, an available parking space division unit 506, a parking route calculation unit 507, and a vehicle control unit 508. Description of the same functions as those of the parking assist ECUs 50 and 150 according to the above embodiments will be omitted, and the description of the above embodiments is borrowed herein.

Figure 17:
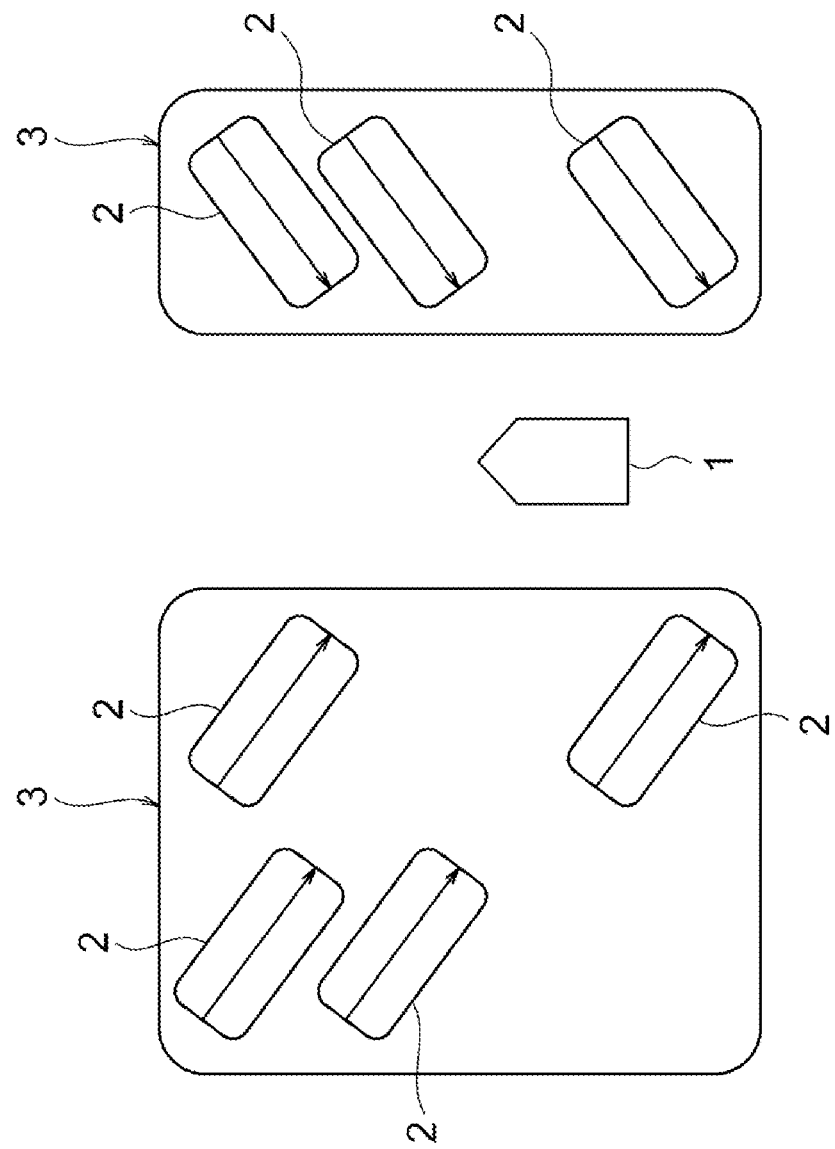
FIG. 17 is a plan view for describing a grouping process for a set of vehicles according to another embodiment of the present invention.

FIG. 17 is a plan view for describing a grouping process for a set of vehicles 3. As illustrated in the figure, the vehicle set division unit 151 groups two or more parked vehicles 2 that have comparable directions (for example, the angle difference is within ±0-10°) into a set of vehicles 3 and outputs information on the set of vehicles 3 and the two or more parked vehicles 2 included in the set of vehicles 3 to the available parking space estimation unit 505. Here, as illustrated in FIG. 18, parked vehicles 2 having different reference distances X may be mixed.

Figure 18:
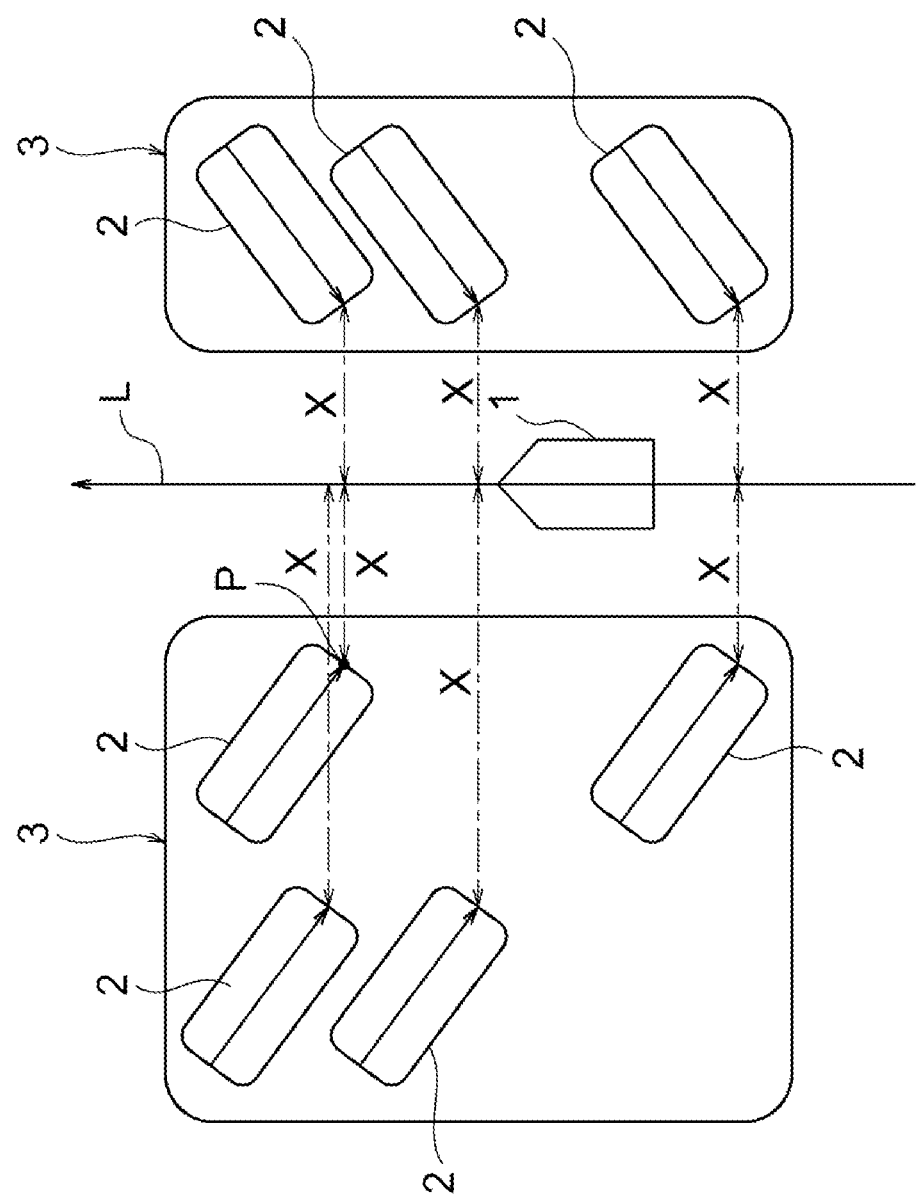
FIG. 18 is plan vie for describing a setting process for a pathway direction reference line and a calculation process for reference distances X according to another embodiment of the present invention.

FIG. 18 is a plan view for describing a setting process for a pathway direction reference line L and a calculation process for reference distances X. The pathway direction reference line setting unit 502 sets the pathway direction reference line L on the pathway for the subject vehicle 1 and outputs the pathway direction reference line L to the reference distance calculation unit 503. Then, the reference distance calculation unit 503 calculates the reference distances X and relative positions of the parked vehicles 2 with respect to the pathway direction reference line L and outputs the calculated reference distances X and relative positions to the vehicle set division unit 504. When calculating the relative positions of the parked vehicles 2 with respect to the pathway direction reference line L, the reference distance calculation unit 503 specifies whether each parked vehicle 2 is located on the right side or left side of the pathway direction reference line L.

Figure 19:
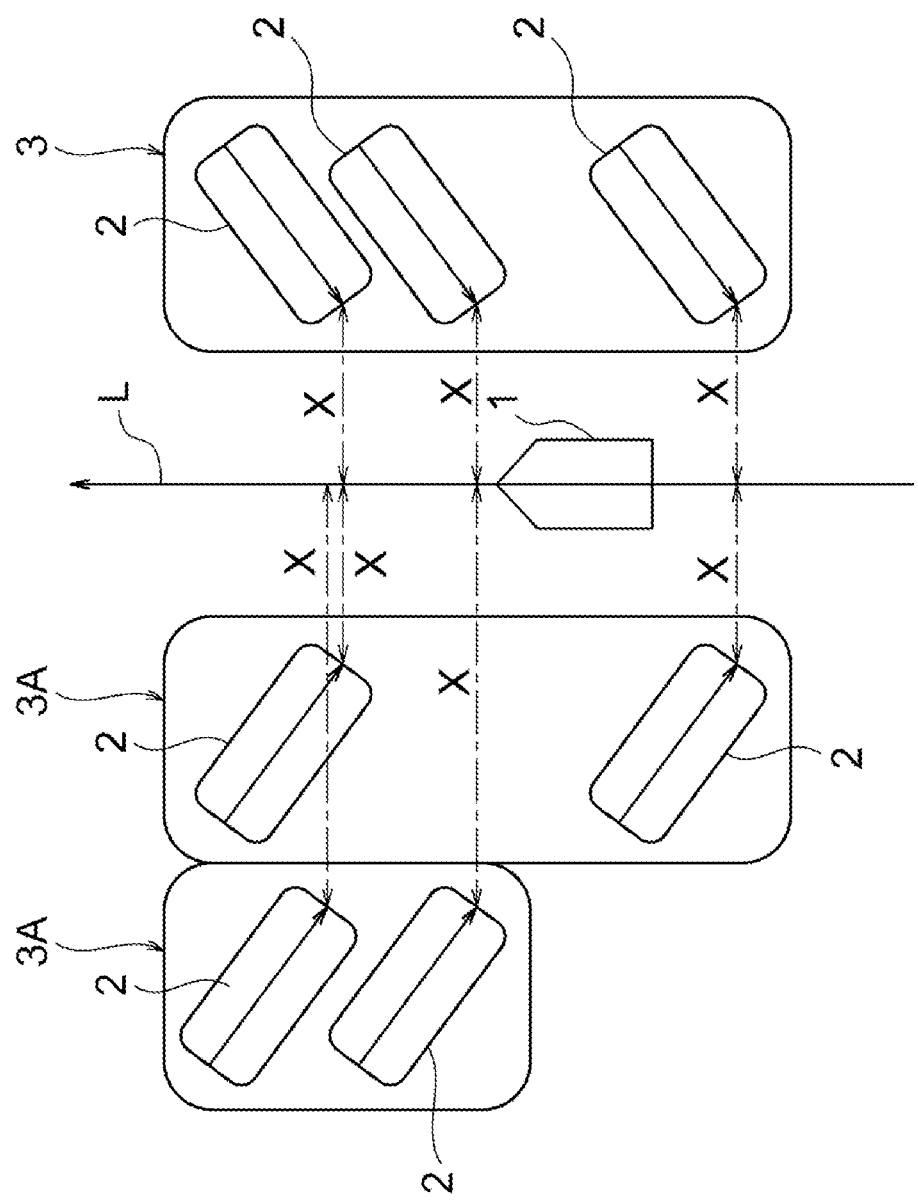
FIG. 19 is a plan view for describing a division process for a set of vehicles according to another embodiment of the present invention.

FIG. 19 is a plan view for describing a division process for a set of vehicles 3. The vehicle set division unit 504 divides a set of vehicles 3 in which parked vehicles 2 having different reference distances X are mixed, further into two or more sets of vehicles 3A on the basis of the reference distances X. In this case, the reference distances X of the parked vehicles 2 included in each set of vehicles 3A are comparable. Then, the vehicle set division unit 504 outputs information on the two or more sets of vehicles 3A and the parked vehicles 2 included in each set of vehicles 3A to the available parking space estimation unit 505.

Figure 20:
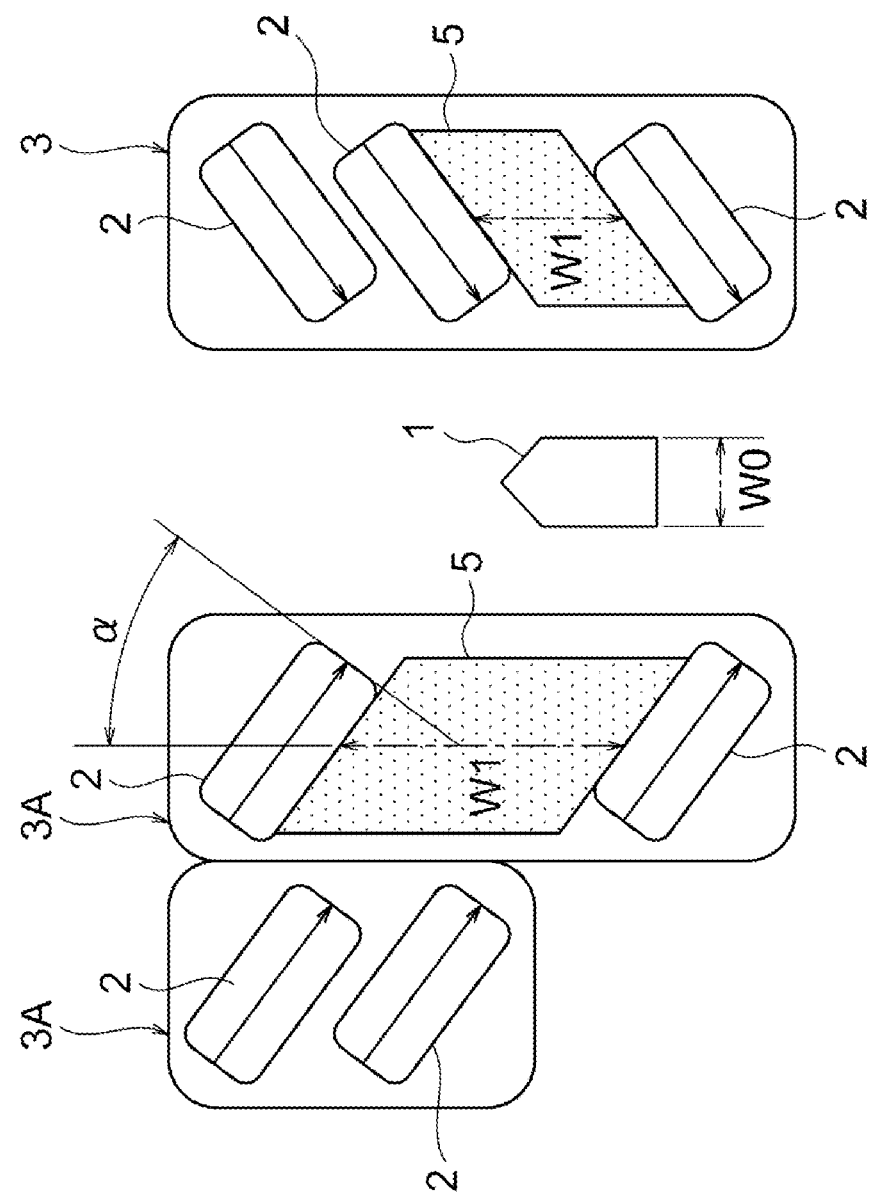
FIG. 20 is a plan view for describing an estimation process for an available parking space according to another embodiment of the present invention.

FIG. 20 is a plan view for describing an estimation process for an available parking space 5. First, when there are two or more sets of vehicles 3, the available parking space estimation unit 505 selects one or more sets of vehicles 3 that are closest to the subject vehicle 1, from among the two or more sets of vehicles 3. Then, the available parking space estimation unit 505 calculates an inter-vehicle distance W1 of adjacent parked vehicles 2 in the selected one or more sets of vehicles 3. Then, when the calculated inter-vehicle distance W1 and the width W0 of the subject vehicle 1 satisfy the relationship of the above Expression (3), the available parking space estimation unit 505 estimates a space in which the inter-vehicle distance W1 satisfies the relationship of Expression (3) as the available parking space 5 and outputs the estimation result to the available parking space division unit 506.

Figure 21:
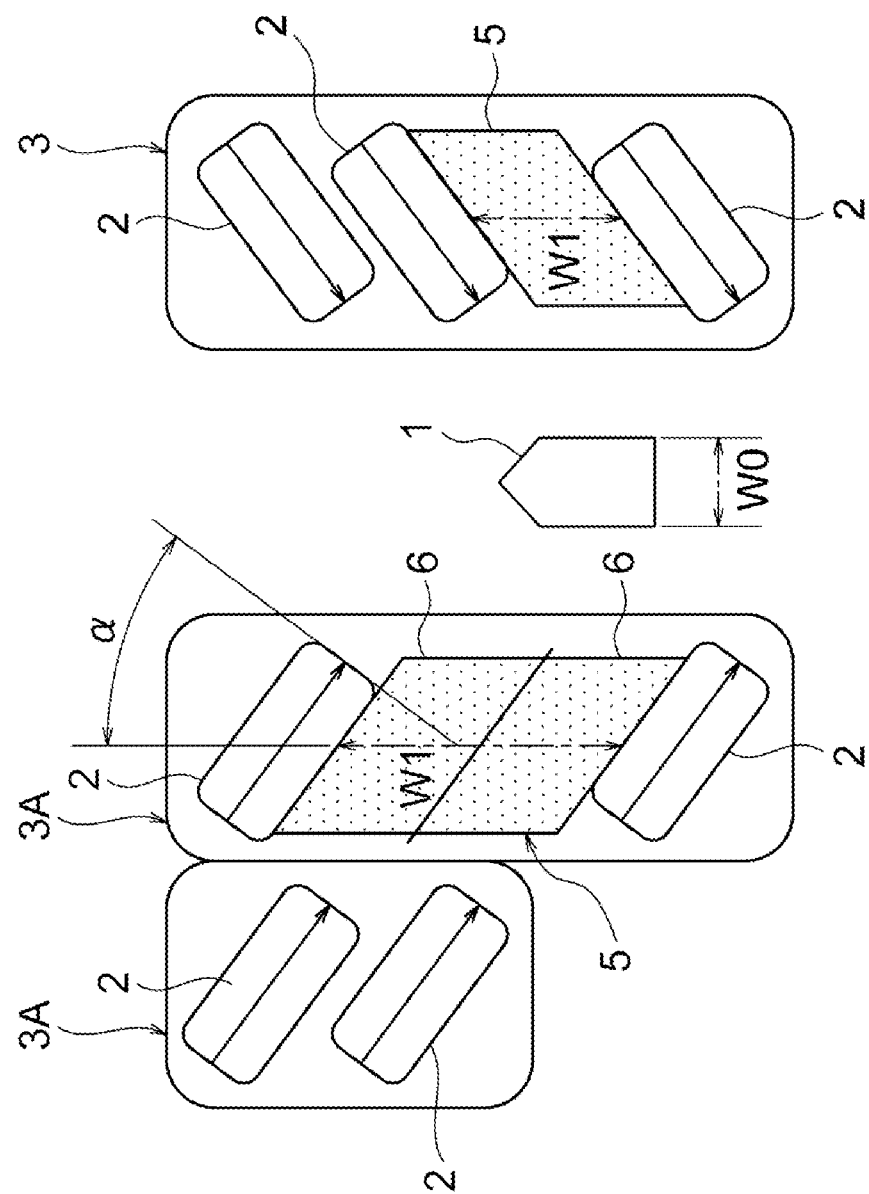
FIG. 21 is a plan view for describing a division process for an available parking space according to another embodiment of the present invention.

FIG. 21 is a plan view for describing a division process for the available parking space 5. The available parking space division unit 506 calculates whether the width W1 of the estimated available parking space 5 corresponds to n times (n is an integer) the value W2/cos α, as represented by the above Expression (4). Then, the available parking space division unit 506 divides the available parking space 5 in the width direction (direction parallel to the pathway direction) by the integer n represented by the above Expression (4) and outputs information on the divided available parking space 5 to the parking route calculation unit 507.

Figure 22:
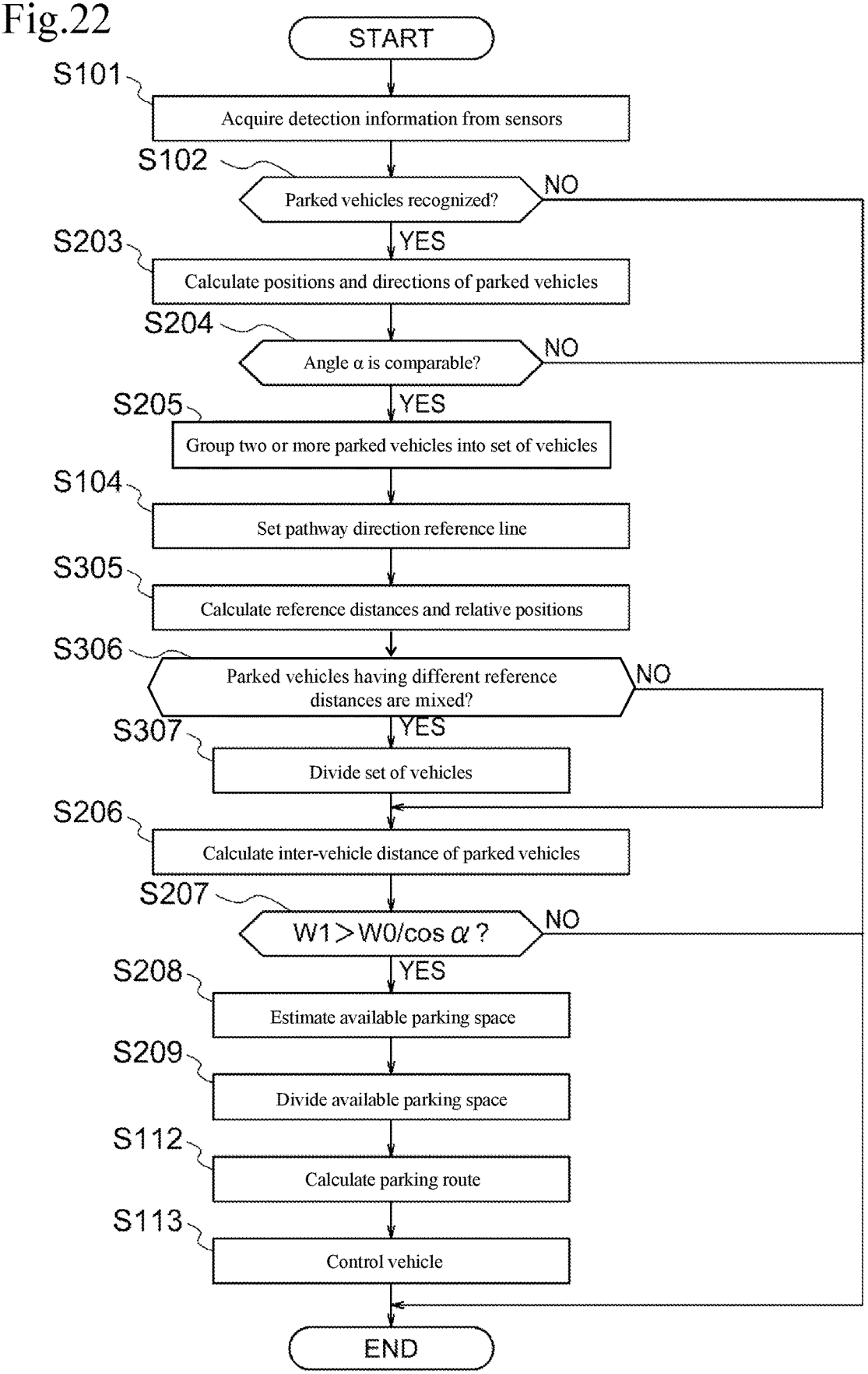
FIG. 22 is a flowchart illustrating the control procedure of a parking assist process according to another embodiment of the present invention.

FIG. 22 is a flowchart illustrating the control procedure of a parking assist process according to the present embodiment. In the present embodiment, when an ON signal is input from the main switch 40 to the parking assist ECU 250, the parking assist process is started, which is followed by step S101.

Steps S101, S102, S203, S204, and S205 are executed in the same manner as in the parking assist process of the above-described embodiments. Then, step S104 is executed in the same manner as in the parking assist process of the above-described embodiment. In this step, the pathway direction reference line setting unit 502 sets the pathway direction reference line L on the pathway for the subject vehicle 1 and outputs the pathway direction reference line L to the reference distance calculation unit 503 (see FIG. 18). Then, in step S305, the reference distance calculation unit 503 calculates the above reference distances X and the relative positions of the parked vehicles 2 with respect to the pathway direction reference line L and outputs the calculated reference distances X and relative positions to the vehicle set division unit 504.

Then, in step S306 and step S307, the vehicle set division unit 504 executes a process of dividing a set of vehicles 3 (see FIG. 19). First, in step S306, the vehicle set division unit 504 determines whether or not there is a set of vehicles 3 in which parked vehicles 2 having different reference distances X are mixed. When an affirmative determination is made in step S306, the routine transitions to step S307, while when a negative determination is made in step S306, the routine transitions to step S206.

In step S307, the vehicle set division unit 504 divides the set of vehicles 3 in which parked vehicles 2 having different reference distances X are mixed, further into two or more sets of vehicles 3A on the basis of the reference distances X. Then, the vehicle set division unit 504 outputs information on the sets of vehicles 3 and 3A and the parked vehicles 2 included therein to the available parking space estimation unit 505.

Then, steps S206, S207, S208, S209, S112, and S113 are executed. The parking assist process in the present embodiment is thus completed.

In the above-described control procedure of the parking assist process, after the parking route to the available parking subspace 6 is calculated, the parking operation is executed to complete the parking assist process, but the present invention is not limited to this, and the routine may return from step S113 to step S102 to sequentially correct the parking route.

As described above, in the parking assist method and parking assist device according to the present embodiment, directions of the parked vehicles 2 included in the recognition information from the set of ranging sensors 10 are detected, and two or more vehicles are grouped into a set of vehicles 3 on the basis of the detected directions of the parked vehicles 2. Moreover, the pathway direction reference line L extending along the pathway of the parking lot is set, the reference distances X between the pathway direction reference line L and the parked vehicles 2 included in the recognition information acquired from the set of ranging sensors 10 are calculated, and the set of vehicles 3 is divided on the basis of the reference distances X. Through this operation, both in the parking lot of a right-angle parking scheme and in the parking lot of an angle parking scheme, the set of vehicles 3 in which parked vehicles 2 having different distances from the pathway are mixed can be divided into two or more sets of vehicles 3A in each of which the distances from the pathway are substantially the same.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the above embodiments have been described on the assumption that the ranging sensors are equipped in the subject vehicle, but the present invention is not limited to this, and one or more embodiments of the present invention may be carried out on the assumption that a sensor provided at a parking lot, a sensor provided on another vehicle, and/or a camera carried by the user are used. In such cases, information on the set of parking frames may be acquired from external to perceive the parking state in the set of parking frames.

In the above-described embodiments, when a space in which the inter-vehicle distance of the parked vehicles 2 is larger than the width of one vehicle exists between the parked vehicles 2 included in the set of vehicles 3, the space is estimated as the available parking space 5. In an alternative embodiment, when a space in which the inter-vehicle distance of the parked vehicles 2 is larger than a predetermined width of a parking frame exists between the parked vehicles 2 included in the set of vehicles 3, the space may be estimated as the available parking space 5.

In the above-described embodiments, when in the grouped set of vehicles 3 the inter-vehicle distance of the parked vehicles 2 located on both sides of the available parking space 5 is larger than a value obtained by multiplying the predetermined width of a parking frame by an integer n larger than one, the available parking space 5 is divided by the integer n in the arrangement direction of the parked vehicles 2 in the set of vehicles 3. In an alternative embodiment, when in the grouped set of vehicles 3 the inter-vehicle distance of the parked vehicles 2 located on both sides of the available parking space 5 is larger than a value obtained by multiplying a predetermined width of a vehicle by an integer n larger than one, the available parking space 5 may be divided by the integer n in the arrangement direction of the parked vehicles 2 in the set of vehicles 3.

DESCRIPTION OF REFERENCE NUMERALS

1 Subject vehicle
2 Parked vehicle
3 Set of vehicles
5 Available parking space
6 Available parking subspace
50 Parking assist ECU
60 Vehicle control ECU
100 Parking assist device
L Pathway direction reference line
X Reference distance

The invention claimed is:

1. A parking assist method executed by a computer provided at a vehicle, the method comprising:
acquiring, from a sensor provided at the vehicle, recognition information on parked vehicles existing in a parking lot;
determining whether or not two or more vehicles parked side by side exist by the recognition information;
when that two or more vehicles parked side by side exist, setting a reference line extending along a pathway of the parking lot;
calculating distances between the reference lie and the parked vehicles included in the recognition information;
extracting a set of one or more vehicles so as to include at least two or more vehicles parked side by side from the recognition information and grouping the set of vehicles on a basis of the calculated distances; and
when a space into which parking is possible exists between the parked vehicles included in the set of vehicles, estimating the space as an available parking space.

2. The parking assist method according to claim 1, further comprising:
detecting directions of the parked vehicles included in the recognition information; and
extracting the two or more vehicles from the recognition information and grouping the two or more vehicles into the set of vehicles on a basis of the detected directions.

3. The parking assist method according to claim 1, wherein when the space in which an inter-vehicle distance of the parked vehicles is larger than a width of one vehicle or a predetermined width of a parking frame exists between the parked vehicles included in the set of vehicles, the space is estimated as the available parking space.

4. The parking assist method according to claim 3, wherein when the space in which a length in a longitudinal direction of the parked vehicles is larger than a length of one vehicle exists between the parked vehicles included in the set of vehicles, the space is estimated as the available parking space.

5. The parking assist method according to claim 3, wherein when the inter-vehicle distance of the parked vehicles located on both sides of the available parking space is larger than a value obtained by multiplying the predetermined width of the parking frame or the width of the one vehicle by an integer n larger than one, the available parking space is divided by the integer n in an arrangement direction of the parked vehicles in the set of vehicles.

6. The parking assist method according to claim 1, further comprising:
generating a parking route to the available parking space; and
controlling a subject vehicle to travel along the parking route.

7. A parking assist device comprising a parking assist controller having a parking assist function, the parking assist controller being provided at a vehicle and configured to:
acquire, from a sensor provided at the vehicle, recognition information on parked vehicles existing in a parking lot;
determine whether or not two or more vehicles parked side by side exist by the recognition information;
when determining that two or more vehicles parked side by side exist, set a reference line extending along a pathway of the parking lot;
calculate distances between the reference line and the parked vehicles included in the recognition information;
extract a set of one or more vehicles so as to include at least two or more vehicles parked side by side from the recognition information and group the set of vehicles on a basis of the calculated distances; and when a space into which parking is possible exists between the parked vehicles included in the grouped set of vehicles, estimate the space as an available parking space.

* * * * *